United States Patent
Tsuda et al.

(10) Patent No.: US 10,361,599 B2
(45) Date of Patent: Jul. 23, 2019

(54) THREE-PHASE ROTATING ELECTRICAL MACHINE

(71) Applicant: Aisin Seiki Kabushiki Kaisha, Kariya-shi (JP)

(72) Inventors: Teppei Tsuda, Anjo (JP); Masafumi Sakuma, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 293 days.

(21) Appl. No.: 15/279,997

(22) Filed: Sep. 29, 2016

(65) Prior Publication Data

US 2017/0093237 A1 Mar. 30, 2017

(30) Foreign Application Priority Data

Sep. 29, 2015 (JP) ................................ 2015-191033

(51) Int. Cl.
*H02K 1/27* (2006.01)
*H02K 29/03* (2006.01)
(Continued)

(52) U.S. Cl.
CPC ............ *H02K 1/2766* (2013.01); *H02K 3/12* (2013.01); *H02K 21/14* (2013.01); *H02K 29/03* (2013.01);
(Continued)

(58) Field of Classification Search
CPC .......... H02K 21/14; H02K 21/16; H02K 1/22; H02K 1/06; H02K 1/27; H02K 1/2766; H02K 19/10; H02K 29/03; H02K 2201/06
See application file for complete search history.

(56) References Cited

U.S. PATENT DOCUMENTS

| 5,682,072 | A | * | 10/1997 | Takahashi | ............ | H02K 1/2733 |
| | | | | | | 310/156.46 |
| 6,218,753 | B1 | * | 4/2001 | Asano | .................... | H02K 1/276 |
| | | | | | | 310/156.53 |

(Continued)

FOREIGN PATENT DOCUMENTS

| CN | 102386699 A | 3/2012 | |
| DE | 10253950 A1 * | 7/2003 | ............. H02K 1/276 |

(Continued)

OTHER PUBLICATIONS

Combined Chinese Office Action and Search Report dated Aug. 2, 2018 in corresponding Chinese Patent Application No. 201610862800.3 (with English Translation and English Translation of Category of Cited Documents), 19 pages.

(Continued)

*Primary Examiner* — Edgardo San Martin
(74) *Attorney, Agent, or Firm* — Oblon, McClelland, Maier & Neustadt, L.L.P.

(57) ABSTRACT

A three-phase rotating electrical machine includes a stator including a stator core provided with a plurality of teeth and a plurality of slots, and winding, the three-phase rotating electrical machine including a rotor including a rotor core and a north magnetic pole and a south magnetic pole, the three-phase rotating electrical machine including a fractional slot configuration, the rotor core including a north magnetic pole acting portion, a south magnetic pole acting portion, a magnetic pole boundary dividing the north magnetic pole acting portion and the south magnetic pole acting portion in the circumferential direction, and a magnetic resistance portion, the magnetic resistance portion restricting the magnetic flux from passing through.

11 Claims, 10 Drawing Sheets

(51) Int. Cl.
*H02K 3/12* (2006.01)
*H02K 21/14* (2006.01)

(52) U.S. Cl.
CPC ..... *H02K 2201/06* (2013.01); *H02K 2213/03* (2013.01)

(56) References Cited

U.S. PATENT DOCUMENTS

| | | | | |
|---|---|---|---|---|
| 7,151,335 B2* | 12/2006 | Tajima | ................. | H02K 1/2766 310/156.48 |
| 7,825,560 B2* | 11/2010 | Lee | ................. | H02K 29/03 310/156.57 |
| 8,212,447 B2* | 7/2012 | Fukuda | ................. | H02K 1/276 310/156.53 |
| 9,184,636 B2* | 11/2015 | Aoyama | ................. | H02K 21/14 |
| 9,343,933 B2* | 5/2016 | Isoda | ................. | H02K 1/2766 |
| 9,912,204 B2* | 3/2018 | Totoki | ................. | H02K 1/276 |
| 9,966,809 B2* | 5/2018 | Ueda | ................. | H02K 1/276 |
| 2002/0175584 A1* | 11/2002 | Koharagi | ................. | H02K 1/2766 310/156.56 |
| 2014/0091663 A1* | 4/2014 | Hazeyama | ................. | H02K 1/276 310/156.11 |
| 2015/0061447 A1* | 3/2015 | Mae | ................. | H02K 1/2766 310/156.53 |
| 2015/0130317 A1* | 5/2015 | Hung | ................. | H02K 1/2766 310/156.12 |
| 2016/0261158 A1* | 9/2016 | Horii | ................. | H02K 1/32 |
| 2018/0034332 A1* | 2/2018 | Takahashi | ................. | H02K 21/14 |
| 2018/0254677 A1* | 9/2018 | Shibamori | ................. | H02K 21/16 |

FOREIGN PATENT DOCUMENTS

| | | | | |
|---|---|---|---|---|
| EP | 1635439 A1 * | 3/2006 | ............... | H02K 1/16 |
| JP | 2000-69695 | 3/2000 | | |
| JP | 2002-165428 | 6/2002 | | |
| JP | 2003-32983 | 1/2003 | | |
| JP | 2004-320952 A | 11/2004 | | |
| JP | 2005-124281 A | 5/2005 | | |
| JP | 2010-75049 | 4/2010 | | |
| JP | 2012-50189 A | 3/2012 | | |
| JP | 2013-46466 A | 3/2013 | | |
| JP | 2015-119547 A | 6/2015 | | |

OTHER PUBLICATIONS

Japanese Office Action issued in Japanese Patent Application No. 2015-191033 dated May 28, 2019, (w/ English Translation).

* cited by examiner

Magnetic flux density in air gap

Prior Art

Magnetic flux density in air gap

Prior Art

THREE-PHASE ROTATING ELECTRICAL MACHINE

CROSS REFERENCE TO RELATED APPLICATIONS

This application is based on and claims priority under 35 U.S.C. § 119 to Japanese Patent Application 2015-191033, filed on Sep. 29, 2015, the entire content of which is incorporated herein by reference.

TECHNICAL FIELD

This disclosure generally relates to a three-phase rotating electrical machine.

BACKGROUND DISCUSSION

A three-phase rotating electrical machine including a fractional slot configuration is used for the purpose of reducing torque ripple in a case where the three-phase rotating electric machine is used as an electric motor and approximating a voltage wave to a sine wave in a case where the three-phase rotating electric machine is used as an electric generator. However, at the three-phase rotating electrical machine including the fractional slot configuration, it is likely that noises and/or vibrations occurring during operation increase compared to a three-phase rotating electrical machine including an integral slot configuration. Examples of techniques of reducing the noises and/or vibrations occurring during the operation of the three-phase rotating electrical machine including the fractional slot configuration are disclosed in JP2003-32983A, JP2010-75049A, JP2002-165428A and JP2000-69695A (which will be hereinafter referred to as Patent references 1 to 4, respectively).

According to a known rotating electrical machine of Patent reference 1, the following expression (1) is established between a number Ns of slots of an armature and a number P of magnetic poles of a rotor. The known rotating electrical machine of Patent reference 1 includes a fractional slot configuration. $Ns=3\times\{P/2-INT(P/10)\}$ ... (1). However, $P\neq 6n$ or $P\neq 8m$ (each of n and m is an integer) and INT(P/10) is a value of an integral part of a quotient obtained when P is divided by 10. Further, in an embodiment of Patent reference 1, a configuration in which the number Ns of slots is 18 and the number P of magnetic poles is 14 is described as an example. It is described in Patent reference 1 that the rotating electrical machine with small noises and vibrations and a high output density can be provided.

In Patent references 2 and 3, a rotating electrical machine including a fractional slot configuration is disclosed in which a number Ns of slots and a number P of magnetic poles are limited. An effect of Patent reference 2 is similar to the effect of Patent reference 1. On the other hand, according to Patent reference 3, vibration of low-order harmonics does not occur and slot ripple is reduced to be low.

According to a permanent magnet rotor of Patent reference 4, substantially circular shaped rotor core sheets are stacked to form rotor cores, and permanent magnets are buried within the rotor cores. Long holes are provided in contact with end faces of the permanent magnets, ends of positive polar or ends of negative polar. When an angle with regard to a pole boundary of the long hole is $\theta i$, the rotor core sheets include N kinds of rotor core sheets having different $\theta i$, and values from $\theta i$ to $\theta N$ are specified. According to Patent reference 4, leakage of flux between the rotor magnetic poles is reduced and pseudo skew is provided in a radial direction in a balanced manner. As a result, noises and vibrations that are caused by cogging torque and/or torque ripple can be lowered.

The exemplified techniques of Patent references 1 to 3 are ideal for the use in a limited range of the number of rotations because the techniques can achieve the low torque ripple, and the low noises and vibrations in such a use. For the use in a wide range of the number of rotations, however, the number of magnetic poles of a rotor cannot be increased due to a restriction of control.

In addition, at the three-phase rotating electrical machine including the fractional slot configuration, the lowest order of a spatial oscillation mode of an electromagnetic force generally corresponds to the greatest common divisor of the number Ns of the slots and the number P of the magnetic poles. In Patent reference 3, the number Ns of the slots and the number P of the magnetic poles which prevent the occurrence of the electromagnetic force (a vibratory force) of the spatial oscillation mode of the second order or lower is defined or specified, however, combinations of the numbers Ns of the slots and the numbers P of the magnetic poles which cause the electromagnetic force of the spatial oscillation mode of the third order and the fourth order are also specified. In this case, deformation modes of a stator which are the third order and the fourth order resonate with the electromagnetic force, and thus the low vibrations and the low noises may not be achieved.

The technique of Patent reference 4 is to reduce the noises and vibrations that are caused by the cogging torque and/or torque ripple exclusively in an integral slot configuration. Therefore, the technique of Patent reference 4 cannot be used in the fractional slot configuration.

A need thus exists for a three-phase rotating electrical machine including a fractional slot configuration, which is not susceptible to the drawbacks mentioned above.

SUMMARY

According to an aspect of this disclosure, a three-phase rotating electrical machine includes a stator including a stator core provided with a plurality of teeth arranged in a circumferential direction and a plurality of slots arranged in the circumferential direction, and winding wound at the plurality of slots. The three-phase rotating electrical machine includes a rotor rotatably supported to face the stator and to be coaxial with the stator, the rotor including a rotor core provided with a plurality of embedding holes arranged in the circumferential direction, and a north magnetic pole and a south magnetic pole which are embedded in the plurality of embedding holes, respectively, to be arranged alternately with each other in the circumferential direction. The three-phase rotating electrical machine includes a fractional slot configuration in which a number of the slots per pole per phase is not an integer number, the number of the slots per pole per phase being obtained by dividing a number of the slots by a number of the north magnetic pole and the south magnetic pole, and by three. The rotor core includes a north magnetic pole acting portion which corresponds to a portion facing the stator and at which magnetic flux of the north magnetic pole acts, a south magnetic pole acting portion which corresponds to a portion facing the stator and at which magnetic flux of the south magnetic pole acts, a magnetic pole boundary dividing the north magnetic pole acting portion and the south magnetic pole acting portion from each other in the circumferential direction, and a magnetic resistance portion provided at a position adjacent to a circumferential end portion of at least one of the north magnetic pole acting portion and the south magnetic pole acting portion, the position adjacent to the circumferential end portion being in a vicinity of the magnetic pole boundary. The magnetic resistance portion restricts the magnetic flux from passing through between the at least one of the north magnetic pole and the south magnetic pole, and the teeth.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment and part of second to eighth embodiments, which are disclosed here, will be described. The embodiments disclosed here relate to a three-phase rotating electrical machine including a fractional slot configuration in which the number of slots per pole per phase is not an integer number, the number of the slots per pole per phase being obtained by dividing the number of slots of a stator by the number of magnetic poles of a movable element, and further by three. A general configuration of a three-phase rotating electrical machine 1 of the first to eighth embodiments of the present disclosure will be described with reference to FIG. 1. The three-phase rotating electrical machine 1 according to the first to eighth embodiments is mounted on, for example, a hybrid vehicle, and operates as an electric motor to drive the vehicle to run and operates as an electric generator to regenerate power at braking. Thus, the three-phase rotating electrical machine operates in a wide range of the number of rotations. A configuration of the three-phase rotating electrical machine 1 according to the first to seventh embodiments includes 8 poles and 60 slots. A configuration of the three-phase rotating electrical machine 1 according to the eighth embodiment includes 8 poles and 36 slots.

Figure 1:
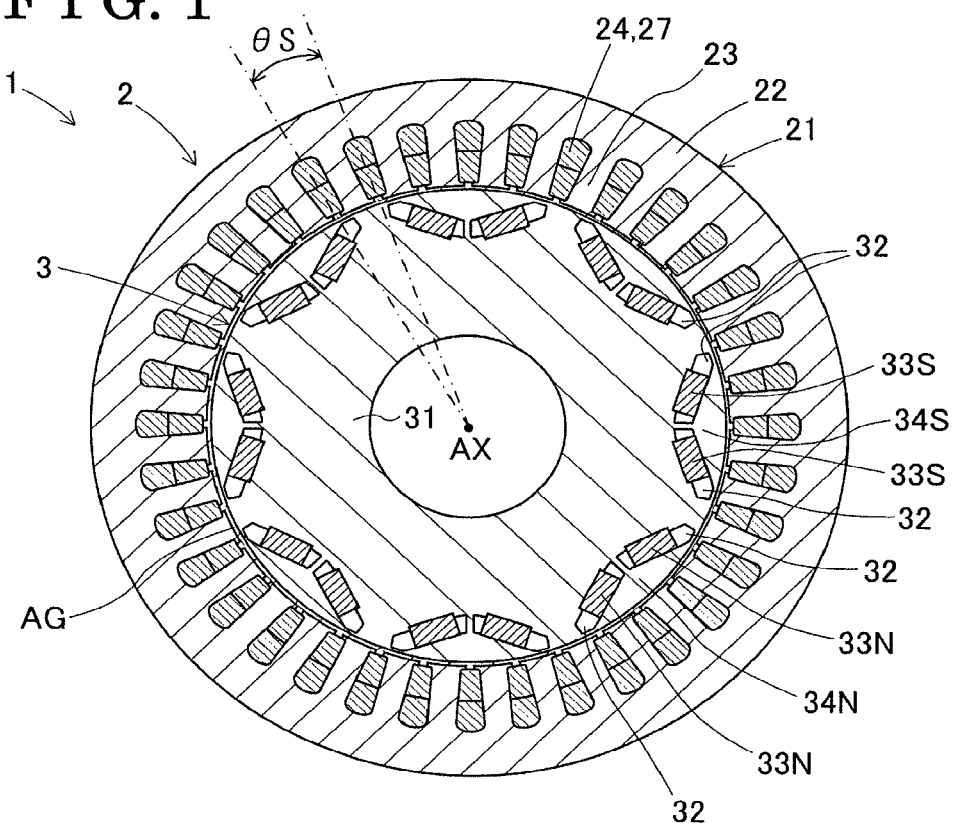
FIG. 1 is a cross-sectional view that is perpendicular to an axial line and illustrates an overall configuration of a three-phase rotating electrical machine according to an eighth embodiment disclosed here.

FIG. 1 is a cross-sectional view that is perpendicular to an axial line AX and illustrates an overall configuration of the three-phase rotating electrical machine 1 according to the eighth embodiment. The three-phase rotating electrical machine 1 according to the first to eighth embodiments includes a stator 2 at an outer circumferential side and a rotor 3 at an inner circumferential side, and includes the configuration of a radial air gap type of an inner rotor type that is substantially axis symmetrical about the axial line AX. The first to seventh embodiments, and the eighth embodiment differ from each other in the number of the slots. In the first to seventh embodiments, a detailed configuration and a position of a magnetic resistance portion, which will be described below, are different from one another.

The stator 2 includes a stator core 21 and a winding 27. The stator core 21 is formed in a substantially circular cylindrical shape. The stator core 21 can be made from plural pieces of iron core material, each formed in a thin plate shape, which are stacked or layered in a direction of the axial line AX. The iron core material is formed by punching magnetic steel sheet, including silicon steel sheet, for example. The stator core 21 includes a yoke 22 formed in an annular shape and circumferentially arranged at the outer circumferential side, and teeth 23 formed to protrude from the yoke 22 radially inwardly and to be arranged in a circumferential direction. A slot 24 is formed between each of the teeth 23 and the adjacent teeth 23 so as to extend in the direction of the axial line AX. A number ns that corresponds to the number of the teeth 23 and to the number of the slots 24 is 60 in each of the first to seventh embodiments, and 36 in the eighth embodiment. Thus, an arrangement pitch angle θS of the slots 24 is obtained by dividing 360 degrees (that is, 360°) by the number ns. The arrangement pitch angle θS is 6 degrees (that is, 6°) in each of the first to seventh embodiments and 10 degrees (that is, 10°) in the eighth embodiment.

The winding 27 is formed by being wound at the slots 24. An average diameter of the winding 27 is illustrated in FIG. 1. For example, the winding 27 is formed by winding a conducting body which is copper wire of which a surface is coated with an insulating layer including enamel. A cross-sectional shape of the conducting body is not particularly specified, and the conducting body including an arbitrary shape may be employed, including a round wire and/or a rectangular wire. In addition, a parallel conductor formed by combining plural thin strands may be used. In a case where the parallel conductor is employed, an eddy current loss occurring at the winding 27 can be reduced, thereby enhancing efficiency compared to a case where a single conductor is employed. Further, a force needed for bending work can be reduced, thereby enhancing efficiency in shape-forming work. A method for winding the winding 27 is not particularly specified, and a known distributed winding and/or a known concentrated winding may be employed.

The rotor 3 is arranged at the inner circumferential side relative to the stator 2 to be coaxial with the stator 2, with a slight air gap AG provided between the rotor 3 and the stator 2. The rotor 3 includes a rotor core 31, and a north magnetic pole 33N and a south magnetic pole 33S. The rotor core 31 is formed in a substantially circular cylinder. The rotor core 31 can be made from plural pieces of iron core material, each formed in a thin plate shape, which are layered or stacked in the direction of the axial line AX. The iron core material is formed by punching magnetic steel sheet, including silicon steel sheet, for example. An output shaft is integrally provided at the rotor core 31, at the inner circumferential side or at an end surface in the direction of the axial line AX. The output shaft and the rotor 3 are rotatably supported by a bearing provided at a casing.

An embedding hole 32 is formed at a position close to an outer circumferential surface of the rotor core 31. In the embodiment, 16 pieces of the embedding holes 32 are provided to be arranged in the circumferential direction and each of the embedding holes 32 is extended in the direction of the axial line AX. As illustrated in the cross-sectional view of FIG. 1, the two embedding holes 32 adjacent to each other in the circumferential direction are arranged as a pair to form a substantially V-shape. A clearance distance between the embedding holes 32 that form the pair is small, and a clearance distance between the pairs of the embedding holes 32 is large. The north magnetic poles 33N or the south magnetic poles 33S are embedded in the respective two embedding holes 32 forming the pair. That is, the homopolar magnetic poles are embedded as a pair in the respective two embedding holes 32 forming the pair. Each of the north magnetic pole 33N and the south magnetic pole 33S is embedded or buried in a circumferential central portion of the corresponding embedding hole 32, and both end portions of the embedding hole 32 in the circumferential direction correspond to gaps.

The north magnetic pole 33N is a permanent magnet including a north pole (an N pole) arranged at a radially outer side and a south pole (an S pole) arranged at a radially inner side. The south magnetic pole 33S is a permanent magnet including a south pole (an S pole) arranged at a radially outer side and a north pole (an N pole) arranged at a radially inner side. In the eight pairs of embedding holes 32, four pairs of the north magnetic poles 33N, each pair includes two of the north magnetic poles 33N, and four pairs of the south magnetic poles 33S, each pair includes two of the south magnetic poles 33S, are embedded alternately with each other in the circumferential direction. The two north magnetic poles 33N provided as the pair function as one magnetic pole and the two south magnetic poles 33S provided as the pair function as one magnetic pole, therefore a number P of magnetic poles is eight.

At the three-phase rotating electrical machine 1, the number of the slots per pole per phase, that is, the number of the slots at each of the magnetic poles at each phase, is obtained in the following expression. The number of the slot at each pole and each phase is 2.5 in each of the first to seventh embodiments, and 1.5 in the eighth embodiment.

Number of the slots at each pole and each phase= (Number ns of the slots 24)/(Number P of magnetic poles)/3

Consequently, the three-phase rotating electrical machine 1 of each of the first to eighth embodiments includes a fractional slot configuration.

Figure 2:
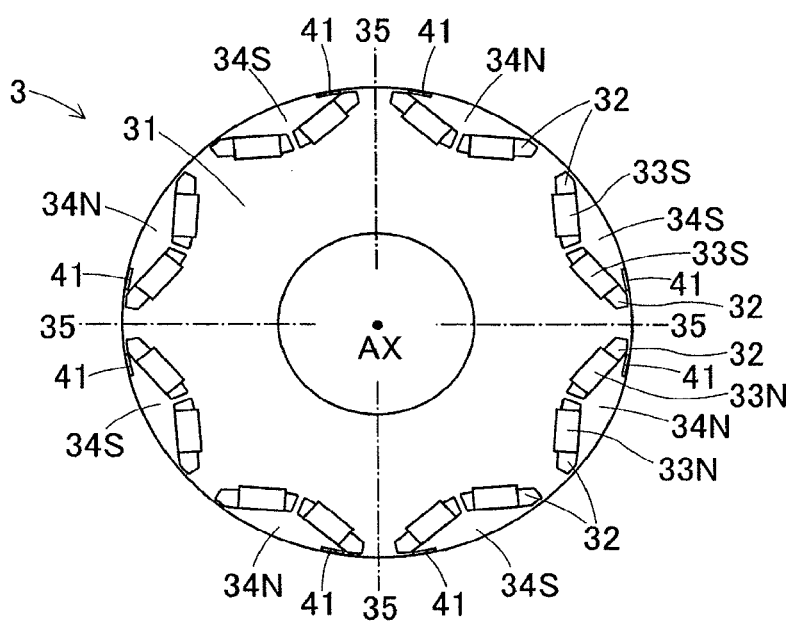
FIG. 2 is a front view explaining a detailed configuration of a rotor of a first embodiment disclosed here.
Figure 3:
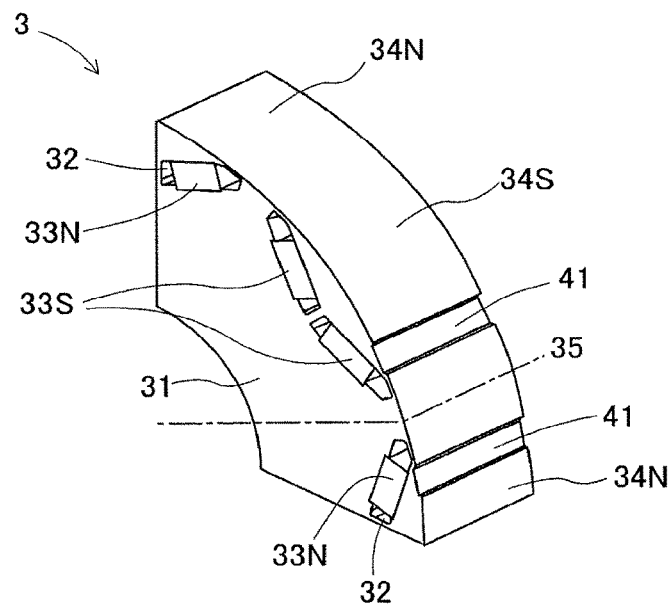
FIG. 3 is a perspective view illustrating a range of a central angle of 90 degrees of the rotor of the first embodiment.

Next, a detailed configuration of the rotor core 31 will be described. FIG. 2 is a front view for explaining the detailed configuration of the rotor 3 of the first embodiment. FIG. 3 is a perspective view illustrating a portion of the rotor 3 of the first embodiment, the portion in a range of a central angle of 90 degrees. The rotor core 31 includes a north magnetic pole acting portion 34N, a south magnetic pole acting portion 34S, a magnetic pole boundary 35 and a magnetic resistance portion 41.

The north magnetic pole acting portion 34N is a portion which is close to the outer circumferential surface of the rotor core 31, the outer circumferential surface which faces or opposes the stator 2. Magnetic flux of the two north magnetic poles 33N forming the pair acts in the north magnetic pole acting portion 34N, and thus the north magnetic pole acting portion 34N is magnetized and formed. Specifically, the north magnetic pole acting portion 34N is around a region surrounded by the pair of embedding holes 32 in which the two north magnetic poles 33N of the rotor core 31 are embedded, and by the outer circumferential surface. The north magnetic pole acting portion 34N includes a function of causing the magnetic flux emitted from the north magnetic poles 33N to face towards the teeth 23 of the stator 2.

Similarly, the south magnetic pole acting portion 34S is a portion which is close to the outer circumferential surface facing or opposing the stator 2. Magnetic flux of the two south magnetic poles 33S forming the pair acts in the south magnetic pole acting portion 34S, and thus the south magnetic pole acting portion 34S is magnetized and formed. Specifically, the south magnetic pole acting portion 34S is around a region surrounded by the pair of embedding holes 32 in which the two south magnetic poles 33S of the rotor core 31 are embedded, and by the outer circumferential surface. The south magnetic pole acting portion 34S includes a function of returning the magnetic flux from the teeth 23 of the stator 2 back to the south magnetic poles 33S.

In the embodiment, the four north magnetic pole acting portions 34N and the four south magnetic pole acting portions 34S are arranged at the outer circumferential surface of the rotor core 31 in a manner that the north magnetic pole acting portion 34N and the south magnetic pole acting portion 34S alternate each other in the circumferential direction. That is, the total number of the north magnetic pole acting portions 34N and the south magnetic pole acting portions 34S is eight, corresponding to eight magnetic poles. A boundary between the north magnetic pole acting portion 34N and the south magnetic pole acting portion 34S corresponds to the magnetic pole boundary. The magnetic pole boundary is provided at eight positions in such a manner that each boundary corresponds to a position between the pairs of the embedding holes 32. The magnetic pole boundaries divide the rotor core 31 into eight equal parts in the circumferential direction. FIG. 2 illustrates four alternate magnetic pole boundaries 35, that is, four every other magnetic pole boundaries 35.

The magnetic resistance portion 41 is a portion that is not included in a known configuration of a three-phase rotating electrical machine. The magnetic resistance portion 41 is provided at at least one of the north magnetic pole acting portion 34N and the south magnetic pole acting portion 34S. The magnetic resistance portion 41 is positioned between the at least one of the north magnetic pole 33N and the south magnetic pole 33S, and the teeth 23. In the first embodiment, the magnetic resistance portion 41 is a recessed portion provided at outer circumferential surfaces (i.e., surfaces) of the north magnetic pole acting portion 34N and the south magnetic pole acting portion 34S, the circumferential surfaces which face or oppose the stator 2. Further, the recessed portion (the magnetic resistance portion 41) is provided at a position adjacent to a circumferential end portion of the north magnetic pole acting portion 34N and the south magnetic pole acting portion 34S, the position adjacent to the circumferential end portion which is in the vicinity of, that is, closer to, the magnetic pole boundary. The recessed portion (the magnetic resistance portion 41) is a space portion at which the iron core material does not exist and magnetic permeability of the recessed portion is smaller by approximately three digits compared to magnetic permeability of the iron core material. Thus, the recessed portion (the magnetic resistance portion 41) restricts the magnetic flux from passing through or travelling between the north magnetic poles 33N and the south magnetic pole acting portion 34S, and the teeth 23.

More specifically, the magnetic resistance portion 41 is provided at each of the north magnetic pole acting portions 34N to be positioned adjacent to the circumferential end portion at a side (that is, a portion) in the vicinity of each alternate magnetic pole boundary 35, and the magnetic resistance portion 41 is provided at each of the south magnetic pole acting portions 34S to be positioned adjacent to the circumferential end portion at a side (that is, a portion) in the vicinity of the each alternate magnetic pole boundary 35. That is, the two magnetic resistance portions 41 are arranged to be side by side with each other such that the alternate magnetic pole boundary 35 is interposed therebetween. Accordingly, the magnetic resistance portions 41 are provided at the eight positions illustrated in FIG. 2. In addition, each of the magnetic resistance portions 41 is formed to extend in the direction of the axial line AX as illustrated in FIG. 3. The magnetic resistance portion 41 is formed by changing a punch die of the iron core material which has been conventionally used. Thus, the rotor core 31 is manufactured with labor hours equivalent to conventional labor hours.

Figure 4:
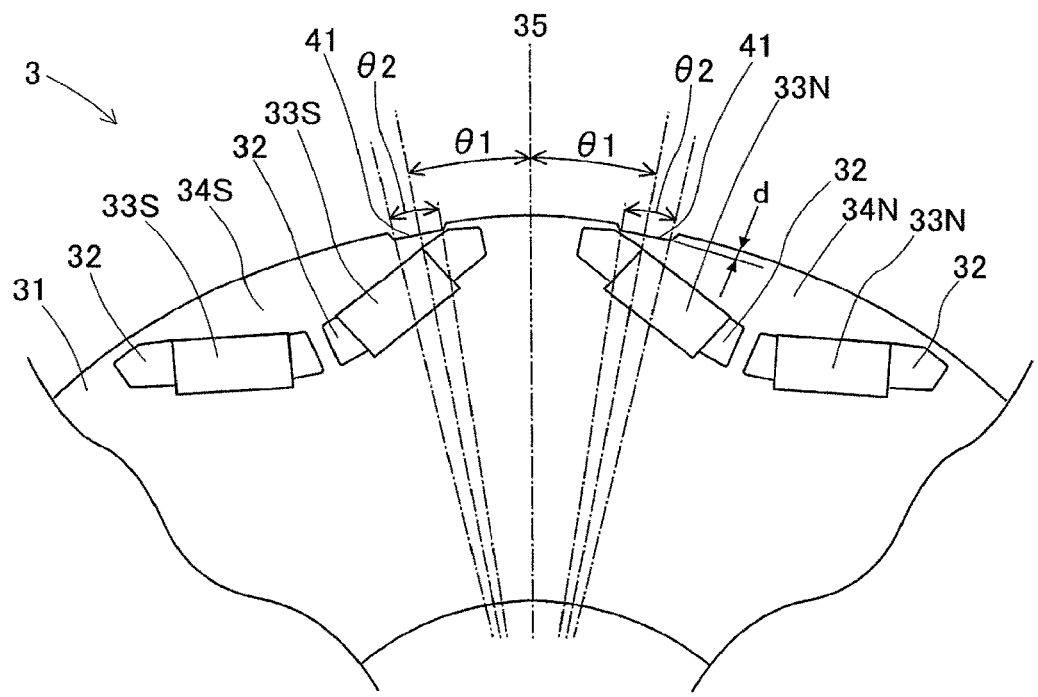
FIG. 4 is a front view explaining detailed configurations and arrangement positions of magnetic resistance portions of the first embodiment.

FIG. 4 is a front view explaining detailed configurations and arrangement positions of the magnetic resistance portions 41 of the first embodiment. Each of the magnetic resistance portions 41 including the configuration of the recessed portion is formed in a manner that the outer circumferential surface of the rotor core 31 is cut out by a predetermined depth d. A separation angle $\theta 1$ (degree) representing an angle by which a circumferential central position of the magnetic resistance portion 41 is separated from the magnetic pole boundary 35 is 6 degrees that is equal to the slot pitch angle $\theta S$ (i.e., the arrangement pitch angle $\theta S$ of the slots 24). A range angle $\theta 2$ (degree) representing a range in which the magnetic resistance portion 41 exists or is formed in the circumferential direction is 3 degrees that is a half of the slot pitch angle $\theta S$.

Each of the depth d, the separation angle $\theta 1$ and the range angle $\theta 2$ is set at an optimal value through repetitive simulation. In a case where the depth d is too large, a stress is concentrated around the embedding hole 32, thereby resulting in insufficient mechanical strength. In a case where the depth d is too small, an effect of reducing noises and vibrations during the operation is decreased. Thus, there exists the optimal value for the depth d. The separation angle $\theta 1$ of 6 degrees and the range angle $\theta 2$ of 3 degrees are the optimal values at which the effects of reducing noises and vibrations are noticeable or remarkable in the simulation results. The results of the simulation with the above-described optimal values are shown in FIGS. 5 to 8 below.

Operation of the three-phase rotating electrical machine 1 of the first embodiment, which includes the above-described configuration, will be described in comparison with a known configuration that does not include the magnetic resistance portion 41. At the three-phase rotating electrical machine 1 of the first embodiment, the lowest order of a spatial oscillation mode of an electromagnetic force is the fourth order, which is derived by obtaining the greatest common divisor of the number ns (=60) of the slots 24 and the number P (=8) of the magnetic poles. Consequently, the stator 2 may be deformed in a deformation mode of the fourth order in such a manner that four portions, in the circumferential direction, of the stator 2 contract towards the radially inner side and other four portions which are positioned between the aforementioned four portions expand towards the radially outer side. The deformation including the expansion and the contraction of the stator 2 arranged at the outer circumferential side causes the noises and vibrations to occur in surroundings. At a three-phase rotating electrical machine of an outer rotor type, deformation of a rotor arranged at the outer circumferential side causes the noises and vibrations.

The contraction and expansion of the stator 2 are caused by a difference between distribution of an electromagnetic force at an N pole side, which acts from the north magnetic pole acting portion 34N to the teeth 23, and distribution of an electromagnetic force at an S pole side, which acts from the south magnetic pole acting portion 34S to the teeth 23. Thus, simulation is performed on the distributions of the electromagnetic forces at the N pole side and the S pole side. In the simulation, magnetic flux density in the air gap AG formed between the stator 2 and the rotor 3 is calculated or estimated, and the distributions of the electromagnetic forces at the N pole side and the S pole side are evaluated.

In theory, an electromagnetic force in the radial direction which acts from the rotor core 31 to the stator core 21 is proportional to the square of the magnetic flux density in the air gap AG. In addition, the magnetic flux density is expressed as a product of a magnetomotive force of the rotor 3 (which is proportional to strength of the north magnetic pole 33N and the south magnetic pole 33S), and permeance of the rotor 3. Consequently, the electromagnetic force in the radial direction, which serves as a characteristic of a magnetic circuit, is evaluated regardless of a magnitude of an electric current flowing through the winding 27 and a phase of the electric current.

In addition, at the three-phase rotating electrical machine 1, in response to a rotational phase of the rotor 3, the numbers of the teeth 23 which the north magnetic pole acting portion 34N and the south magnetic pole acting portion 34S oppose change. Thus, a state in which imbalance of the distributions of the electromagnetic forces between the N pole side and at the S pole side is largest, and a state in which the imbalance is smallest are considered. The state in which the imbalance is largest corresponds to a state in which a circumferential center of the north magnetic pole acting portion 34N or a circumferential center of the south magnetic pole acting portion 34S directly faces the teeth 23, that is, the corresponding tooth of the teeth 23. The simulation is performed on an example case in which the circumferential center of the south magnetic pole acting portion 34S directly faces the teeth 23. In addition, the state in which the imbalance is smallest corresponds to a state in which the magnetic pole boundary 35 directly faces the teeth 23, that is, the corresponding tooth of the teeth 23.

Figure 5:
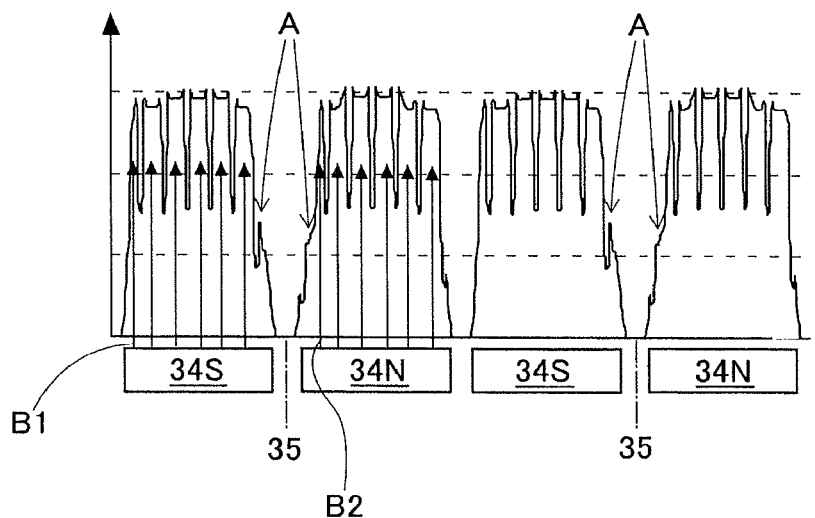
FIG. 5 is a diagram showing a calculation result of magnetic flux density in an air gap in a state where a circumferential center of a south magnetic pole acting portion directly faces teeth according to the first embodiment.
Figure 6:
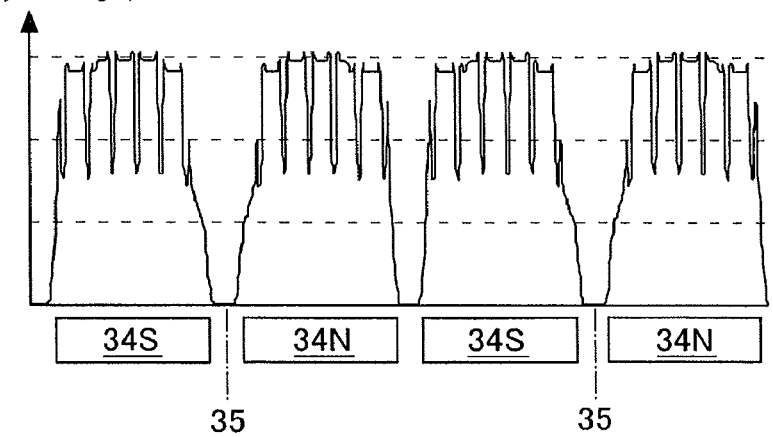
FIG. 6 is a diagram showing a calculation result of magnetic flux density in the air gap in a state where a magnetic pole boundary directly faces the teeth according to the first embodiment.
Figure 7:
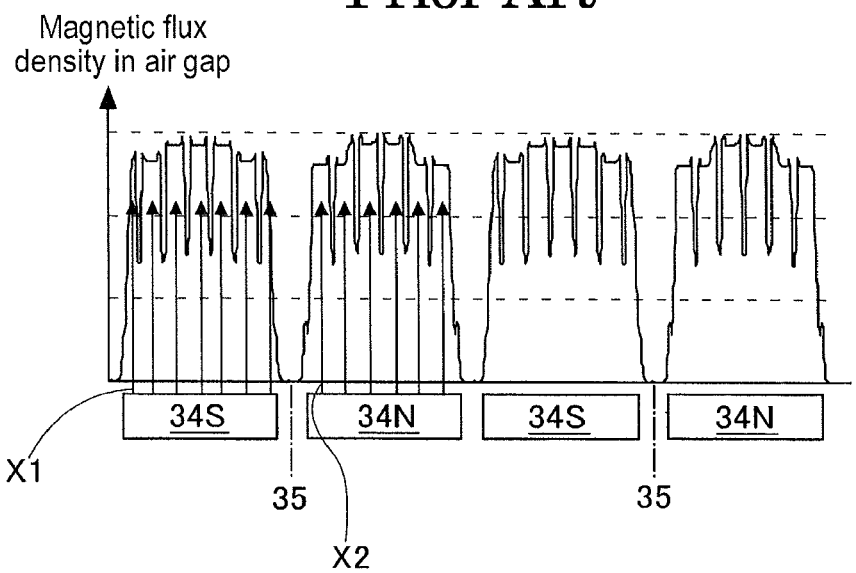
FIG. 7 is a diagram showing a calculation result in the same state as FIG. 5, according to a known configuration that does not include the magnetic resistance portion.
Figure 8:
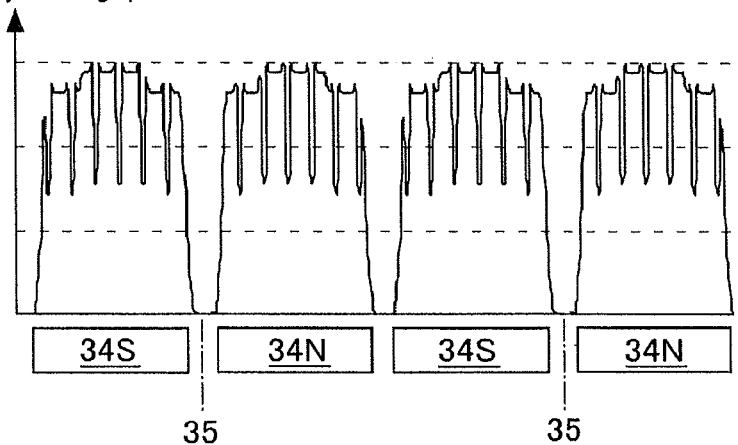
FIG. 8 is a diagram showing a calculation result in the same state as FIG. 6, according to the known configuration.

FIG. 5 is a diagram showing a calculation result of the magnetic flux density in the air gap AG in a state where the circumferential center of the south magnetic pole acting portion 34S directly faces the teeth 23 according to the first embodiment. FIG. 6 is a diagram showing a calculation result of the magnetic flux density in the air gap AG in a state where the magnetic pole boundary 35 directly faces the teeth 23 according to the first embodiment. On the other hand, FIG. 7 is a diagram showing a calculation result of a known configuration that does not include the magnetic resistance portion 41, in the same state as FIG. 5. FIG. 8 is a diagram showing a calculation result of the known configuration, in the same state as FIG. 6. In each of FIGS. 5 to 8, the horizontal axis represents a portion of the rotor 3 in a range of a central angle of 180 degrees, that is, the portion corresponding the south magnetic pole acting portions 34S and the north magnetic pole acting portions 34N that are equivalent to four magnetic poles. The vertical axis represents the magnetic flux density in the air gap AG.

In the known configuration of FIG. 7, the electromagnetic force at the S pole side of the south magnetic pole acting portion 34S acts on the seven teeth 23 as indicated by arrows X1. On the other hand, the electromagnetic force at the N pole side of the north magnetic pole acting portion 34N acts on the six teeth 23 as indicated by arrows X2. Due to the imbalance, in the known configuration, the stator 2 is deformed largely in the deformation mode of the fourth order, thereby increasing the noises and vibrations at the operation.

In contrast, in the first embodiment of FIG. 5, as indicated by arrows A, the magnetic flux density in the vicinity of the magnetic pole boundary 35 is reduced by the function of the magnetic resistance portion 41. Thus, as indicated by arrows B1, the electromagnetic force at the S pole side of the south magnetic pole acting portion 34S is reduced to act on the six teeth 23. As indicated by arrows B2, the electromagnetic force at the N pole side of the north magnetic pole acting portion 34N remains acting on the six teeth 23. That is, the distribution of the electromagnetic force at the S pole side of the south magnetic pole acting portion 34S approximates the distribution of the electromagnetic force at the N pole side of the north magnetic pole acting portion 34N. Consequently, the imbalance between the electromagnetic force at the N pole side and the electromagnetic force at the S pole side is alleviated or reduced and the deformation of the stator 2 is reduced, and thus the noises and vibrations during the operation become lower than the known configuration.

In the known configuration of FIG. 8, the electromagnetic force of the north magnetic pole acting portion 34N and the electromagnetic force of the south magnetic pole acting portion 34S form a substantially left-right mirror symmetry shape relative to the magnetic pole boundary 35, and are originally balanced. The balance is maintained in the first embodiment of FIG. 6. That is, the magnetic resistance portion 41 includes the function of alleviating the unbalanced state in a case where the electromagnetic forces at the N pole side and the S pole side are unbalanced largely. In a case where the electromagnetic forces at the N pole side and the S pole side are originally balanced, the magnetic resistance portion 41 maintains the balanced state.

In FIG. 5, the magnetic flux density in the vicinity of each magnetic pole boundary 35 is reduced, and according to the reduction, the magnetic flux density at other positions is increased compared to the known configuration (refer to FIG. 7). Thus, the entire magnetic flux reciprocating or travelling back and forth between the stator 2 and the rotor 3 remains unchanged. This means that torque outputted when the three-phase rotating electrical machine 1 operates as the electric motor is not lost or decreased and that electric power outputted when the three-phase rotating electrical machine 1 operates as the electric generator is not lost or decreased.

As a result of the simulation, at the three-phase rotating electrical machine 1 of the first embodiment, a sound pressure level of the noises and vibrations which correspond to the spatial oscillation mode of the fourth order is reduced by 16 dB compared to the known configuration. In addition, it is confirmed that the torque outputted when the three-phase rotating electrical machine 1 operates as the electric motor is almost not lost.

In the first to seventh embodiments, the optimal values, that is, 6 degrees (6°) of the separation angle $\theta 1$ and the 3 degrees (3°) of the range angle $\theta 2$, are generalized with the use of the number ns of the slots 24 and the arrangement pitch angle $\theta S$ of the slots 24. Thus, the following (Expression 1) and (Expression 2) are obtained.

$$\theta 1 = \theta S = 360/ns \qquad \text{(Expression 1)}$$

$$\theta 2 = 0.5 \times \theta S = 180/ns \qquad \text{(Expression 2)}$$

Further, in the eighth embodiment, as a result of a simulation in which the separation angle $\theta 1$ and the range angle $\theta 2$ are changed or altered, the sound pressure level is reduced by 5 dB or more in angle range expressed by (Expression 3) and (Expression 4) shown below, thereby showing effectiveness.

$$7.5 \leq \theta 1 \leq 12.5 \qquad \text{(Expression 3)}$$

$$2.5 \leq \theta 2 \leq 7.5 \qquad \text{(Expression 4)}$$

In the first to eighth embodiments, (Expression 3) and (Expression 4) are generalized with the use of the number ns of the slots 24 and the arrangement pitch angle θS of the slots 24. The following (Expression 5) and (Expression 6) are obtained.

$$270/ns = 0.75 \times \theta S \leq \theta 1 \leq 1.25 \times \theta S = 450/ns \quad \text{(Expression 5)}$$

$$90/ns = 0.25 \times \theta S \leq \theta 2 \leq 0.75 \times \theta S = 270/ns \quad \text{(Expression 6)}$$

That is, it can be generally estimated that the noises and vibrations at the operation are effectively reduced in a case where the separation angle θ1 is in a range of 0.75 times to 1.25 times the arrangement pitch angle θS, and the range angle θ2 is in a range of 0.25 times to 0.75 times the arrangement pitch angle θS.

The three-phase rotating electrical machine 1 of the first embodiment includes the stator 2 including the stator core 21 provided with the plural teeth 23 arranged in the circumferential direction and the plural slots 24 arranged in the circumferential direction, and the winding 27 wound at the plural slots 24, the rotor 3 rotatably supported to face the stator 2 and to be coaxial with the stator 2. The rotor 3 includes the rotor core 31 provided with the plural embedding holes 32 arranged in the circumferential direction, and the north magnetic poles 33N and the south magnetic poles 33S which are embedded in the plural embedding holes 32, respectively, to be arranged alternately with each other in the circumferential direction. The three-phase rotating electrical machine 1 includes the fractional slot configuration in which the number of the slots 24 per pole per phase is not an integer number, the number of the slots 24 per pole per phase being obtained by dividing the number ns of the slots 24 by the number P of the north magnetic poles 33N and the south magnetic poles 33S, and by three. The rotor core 31 includes the north magnetic pole acting portions 34N which correspond to the portions facing the stator 2 and at which the magnetic flux of the north magnetic poles 33N act, the south magnetic pole acting portions 34S which correspond to the portions facing the stator 2 and at which the magnetic flux of the south magnetic poles 33S act, the magnetic pole boundaries 35 dividing the north magnetic pole acting portions 34N and the south magnetic pole acting portions 34S from each other in the circumferential direction, the magnetic resistance portions 41 provided at the position adjacent to the circumferential end portion of at least one of the north magnetic pole acting portion 34N and the south magnetic pole acting portion 34S, the position adjacent to the circumferential end portion being in the vicinity of the magnetic pole boundary 35, and the magnetic resistance portion 41 restricting the magnetic flux from passing through between the at least one of the north magnetic pole 33N and the south magnetic pole 33S, and the teeth 23.

At the three-phase rotating electrical machine 1 of the first embodiment, the number of the teeth 23 of the stator core 21, which the north magnetic pole acting portion 34N and the south magnetic pole acting portion 34S of the rotor core 31 face, changes in response to the rotational phase of the rotor 3. Thus, the difference arises between the distribution of the electromagnetic force at the N pole side which acts on the teeth 23 from the north magnetic pole acting portion 34N and the distribution of the electromagnetic force at the S pole side which acts on the teeth 23 from the south magnetic pole acting portion 34S, thereby causing the noises and vibrations. By forming the magnetic resistance portion 41 in the vicinity of the magnetic pole boundary 35 of the rotor core 31, the intentional imbalance in the distribution of the permeance (the reciprocal of magnetic resistance) in the circumferential direction is generated so that the distribution of the magnetic flux is changed. Accordingly, the distribution of the electromagnetic force at the N pole side and the distribution of the electromagnetic force at the S pole side are changed to reduce the difference therebetween, thereby lowering the noises and vibrations at a time of operation than the conventional case.

In addition, the three-phase rotating electrical machine 1 of the first embodiment can be implemented without being limited in the number of P of the magnetic poles of the rotor 3 and without being limited in a method of controlling the operation. Therefore, the effect of decreasing the noises and vibrations is obtained even in a case where the three-phase rotating electrical machine 1 is used in a wide range of the number of rotations.

Further, the magnetic pole boundary 35 is provided at plural positions, and the magnetic resistance portion 41 is provided at each of the north magnetic pole acting portions 34N, at the position adjacent to the circumferential end portion at the portion (that is, the side) in the vicinity of each alternate magnetic pole boundary 35 out of the plural magnetic pole boundaries 35, and the magnetic resistance portion 41 is provided at each of the south magnetic pole acting portions 34S, at the position adjacent to the circumferential end portion at the portion (that is, the side) in the vicinity of the each alternate magnetic pole boundary 35 out of the plural magnetic pole boundaries 35. Consequently, in a case where the electromagnetic forces at the N pole side and the S pole side are unbalanced significantly, the magnetic resistance portion 41 alleviates the unbalanced state, and thus the effect of reducing the noises and vibrations becomes prominent.

Further, the magnetic resistance portion 41 corresponds to the recessed portion provided at a surface of the at least one of the north magnetic pole acting portion 34N and the south magnetic pole acting portion 34S, and the surface faces the stator 2. Consequently, the magnetic resistance portion 41 including the recessed-portion configuration is easily formed by changing the punch die used for the iron core material. In addition, the number of parts and components which form the rotor 3 does not increase, thereby restricting costs from increasing.

Figure 9:
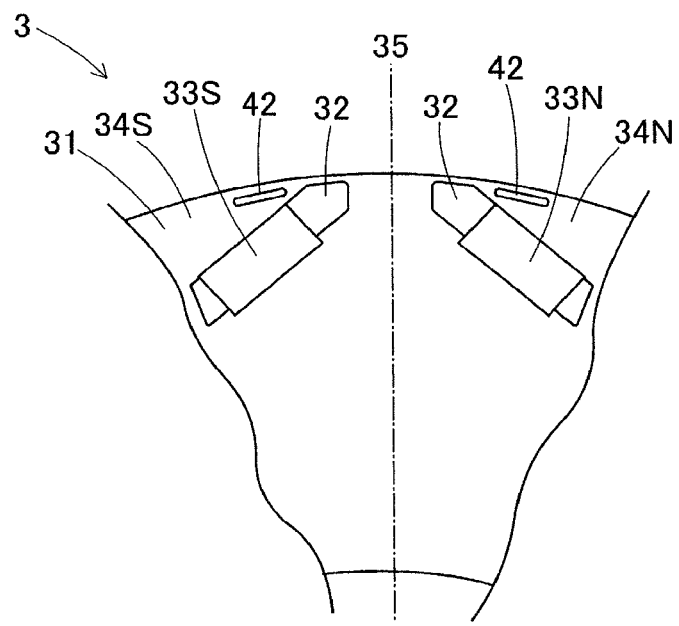
FIG. 9 is a front view explaining configurations and arrangement positions of magnetic resistance portions of a three-phase rotating electrical machine of a second embodiment disclosed here.

The second to seventh embodiments will be described. A configuration of the three-phase rotating electrical machine 1 according to the second embodiment will be described, focusing on an aspect that is different from the first embodiment. In the second embodiment, a shape and configuration of a magnetic resistance portion 42 is different from the first embodiment and the configurations of the other portions are the same as the first embodiment. FIG. 9 is a front view explaining the configurations and arrangement positions of the magnetic resistance portions 42 of the three-phase rotating electrical machine of the second embodiment.

As illustrated in FIG. 9, the magnetic resistance portion 42 of the second embodiment is a hole provided at an inner portion of the north magnetic pole acting portion 34N and at an inner portion the south magnetic pole acting portion 34S. The holes (the magnetic resistance portions 42) are provided at eight positions that are similar to the eight positions at which the magnetic resistance portions 41 illustrated in FIG. 2 are provided. The holes (the magnetic resistance portions 42) are arranged at the radially outer side relative to the north magnetic pole 33N and the south magnetic pole 33S to be separated therefrom slightly. Each of the magnetic resistance portions 42 is formed to be extended in the circumferential direction.

Figure 10:
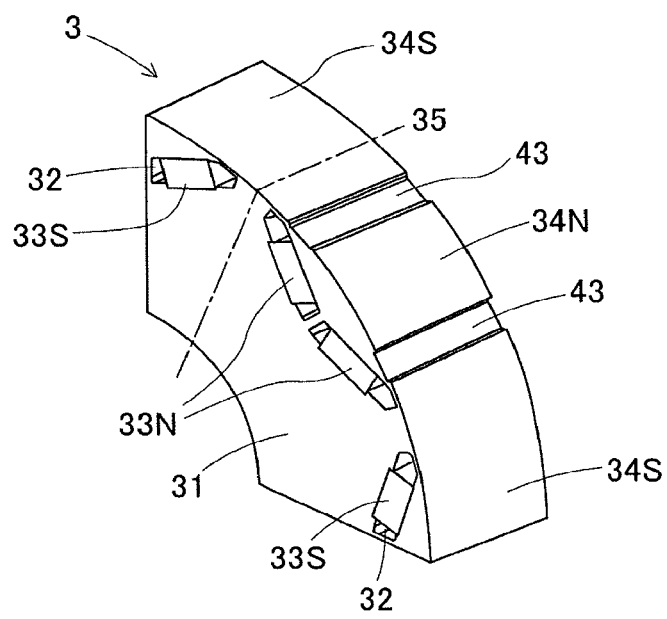
FIG. 10 is a perspective view explaining arrangement positions of magnetic resistance portions of a three-phase rotating electrical machine of a third embodiment disclosed here, in which a range of a central angle of 90 degrees of the rotor is illustrated.

Next, a configuration of the three-phase rotating electrical machine 1 according to the third embodiment will be described, focusing on an aspect that is different from the first embodiment. In the third embodiment, an arrangement position of a magnetic resistance portion 43 is different from the first embodiment and the configurations of the other portions are the same as the first embodiment. FIG. 10 is a diagram explaining the arrangement position of the magnetic resistance portion 43 of the three-phase rotating electrical machine of the third embodiment. FIG. 10 is a perspective view illustrating a portion of the rotor 3 of the third embodiment, the portion in a range of a central angle of 90 degrees.

As illustrated in FIG. 10, the magnetic resistance portion 43 of the third embodiment is provided at each of the north magnetic pole acting portions 34N, at the position adjacent to the circumferential end portion at each side in the circumferential direction. The magnetic resistance portion 43 is not provided at the south magnetic pole acting portions 34S. Contrary to the above, a configuration may be employed in which the magnetic resistance portion 43 of the third embodiment is provided at each of the south magnetic pole acting portions 34S, at the position adjacent to the circumferential end portion at each side in the circumferential direction, and the magnetic resistance portion 43 is not provided at the north magnetic pole acting portions 34N. Each of the magnetic resistance portions 43 includes the configuration of the recessed portion and the detailed configuration thereof is similar to the configuration of the magnetic resistance portion 41 illustrated in FIG. 4.

According to the simulation result, at the three-phase rotating electrical machine 1 of the first embodiment, the noises and vibrations are reduced, however, there is a problem that torque ripple and cogging torque increase. It is estimated that the problem attributes to that the arrangement positions of the magnetic resistance portions 41 are in a particular angle range in the circumferential direction, in other words, the magnetic resistance portions 41 are arranged in the vicinity of the alternate magnetic pole boundaries 35 in an unbalanced or biased manner. That is, it can be considered that the increase in the torque ripple and cogging torque is caused by the imbalance, in the circumferential direction, of the positions at which the permeance is changed. In addition, a problem is included that, due to the magnetic resistance portions 41 (the recessed portions), a mass of the rotor 3 is accordingly unbalanced in the circumferential direction.

As a further enhancement, in the fourth to seventh embodiment, the rotor core is divided into two iron core units 51 and 52. The iron core units 51 and 52 are laminated on each other in the direction of the axial line AX. The iron core units 51 and 52 may be rotationally built up on each other, that is, the iron core units may be laminated onto each other while being rotated. Thus, the arrangement positions of magnetic resistance portions 441 to 444, 451 to 454, 461 to 464, and 471 to 474 in the circumferential direction are made different between the iron core unit 51 and the iron core unit 52. Accordingly, the positions at which the permeance is changed are dispersed in the circumferential direction, and the imbalance in the mass of the rotor 3 is reduced.

In the fourth to seventh embodiments, the stator 2 includes the 60-slot configuration similarly to the stator 2 of the first embodiment. Further, also a cross-sectional configuration of the embedding holes 32, the north magnetic poles 33N, the south magnetic poles 33S, and the magnetic resistance portions 441 to 444, 451 to 454, 461 to 464, 471 to 474 is similar to the first embodiment. Each of FIGS. 11 to 14 is a diagram explaining a three-phase rotating electrical machine of the fourth to seventh embodiments, and illustrates a portion of the rotor 3 in a range of a central angle of 90 degrees.

In the fourth to seventh embodiments, the rotor core includes a first iron core unit 51 and a second iron core unit 52 which are arranged in the direction of the axial line AX and are rotationally laminated on each other. The north magnetic pole 33N which is common between the first and second iron core units 51 and 52, and the south magnetic pole 33S which is common between the first and second iron core units 51 and 52 are embedded in the first and second iron core units 51 and 52. The north magnetic pole acting portion 34N and the south magnetic pole acting portion 34S are formed at each of the first and second iron core units 51 and 52 due to the common north magnetic pole 33N and the common south magnetic pole 33S. Here, the north magnetic pole acting portion 34N formed at the first iron core unit 51 and the north magnetic pole acting portion 34N formed at the second iron core unit 52 are considered as different portions from each other. The south magnetic pole acting portion 34S formed at the first iron core unit 51 and the south magnetic pole acting portion 34S formed at the second iron core unit 52 are considered as different portions from each other. Therefore, the total number of the north magnetic pole acting portions 34N and the south magnetic pole acting portions 34S is 16 corresponding to the 16 magnetic poles, which is twice the total number of the north magnetic pole acting portions 34N and the south magnetic pole acting portions 34S in the first embodiment.

On the other hand, magnetic pole boundaries 36, 361 and 362 each of which divides the north magnetic pole acting portion 34N and the south magnetic action portion 34S from each other in the circumferential direction are extended in the direction of the axial line AX over a boundary surface between the two iron core units 51 and 52. Therefore, each of the magnetic pole boundaries 36, 361 and 362 is considered to be common between the iron core units 51 and 52. Consequently, the magnetic pole boundaries 36, 361 and 362 are provided at the eight positions in a similar manner to the first embodiment.

Each of the north magnetic pole acting portion 34N and the south magnetic action portion 34S includes the position adjacent to the circumferential end portion which is in the vicinity of the magnetic pole boundary 36, 361, 362 at each circumferential side. Accordingly, the total number of the positions adjacent to the end portions is 32, that is, twice (both sides in the circumferential direction) of 16 (which corresponds to the number of the magnetic poles). In each of the fourth to seventh embodiments, the magnetic resistance portions 441 to 444, 451 to 454, 461 to 464, and 471 to 474 are arranged at 16 positions, that is, a half of the total number of the positions adjacent to the circumferential end portion. In other words, in FIGS. 11 to 14 each of which illustrate a range of a quarter of the rotor 3, the magnetic resistance portions 441 to 444, the magnetic resistance portions 451 to 454, the magnetic resistance portions 461 to 464, and the magnetic resistance portions 471 to 474 are provided at four positions, respectively. Further, the magnetic resistance portions 441 to 444 are arranged not to be side by side with each other in the direction of the axial line AX, the magnetic resistance portions 451 to 454 are arranged not to be side by side with each other in the direction of the axial line AX, the magnetic resistance portions 461 to 464 are arranged not to be side by side with each other in the direction of the axial line AX, and the magnetic resistance portions 471 to 474 are arranged not to be side by side with each other in the direction of the axial line AX.

Figure 11:
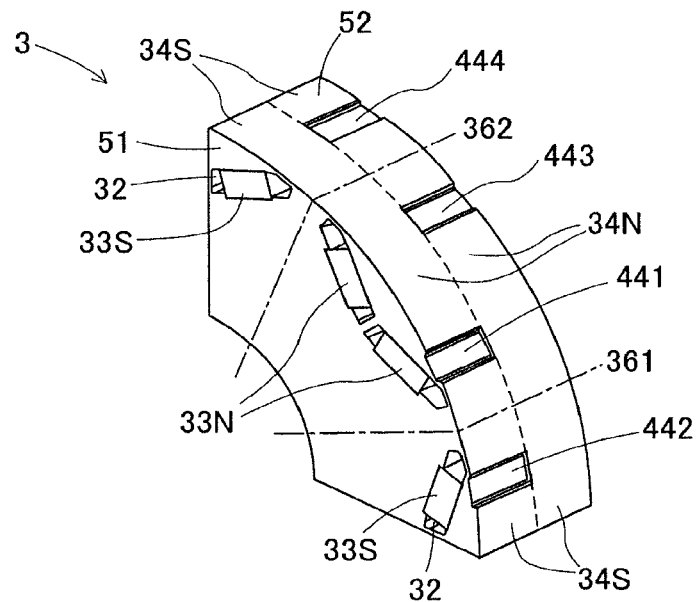
FIG. 11 is a diagram explaining a three-phase rotating electrical machine of a fourth embodiment disclosed here, which is a perspective view illustrating a range of a central angle of 90 degrees of the rotor.

In the fourth embodiment illustrated in FIG. 11, the first magnetic resistance portion 441 is arranged at the position adjacent to the circumferential end portion of each of the north magnetic pole acting portions 34N of the first iron core unit 51, the position adjacent to the circumferential end portion which is at a side (that is, a portion) in the vicinity of an odd-numbered magnetic pole boundary 361 as counted in the circumferential direction. The second magnetic resistance portion 442 is arranged at the position adjacent to the circumferential end portion of each of the south magnetic pole acting portions 34S of the first iron core unit 51, the position adjacent to the circumferential end portion which is at a side (that is, a portion) in the vicinity of the odd-numbered magnetic pole boundary 361 as counted in the circumferential direction. The third magnetic resistance portion 443 is arranged at the position adjacent to the circumferential end portion of each of the north magnetic pole acting portions 34N of the second iron core unit 52, the position adjacent to the circumferential end portion which is at a side (that is, a portion) in the vicinity of an even-numbered magnetic pole boundary 362 as counted in the circumferential direction. The fourth magnetic resistance portion 444 is arranged at the position adjacent to the circumferential end portion of each of the south magnetic pole acting portions 34S of the second iron core unit 52, the position adjacent to the circumferential end portion which is at a side (that is, a portion) in the vicinity of the even-numbered magnetic pole boundary 362 as counted in the circumferential direction. Each of the first to fourth magnetic resistance portions 441 to 444 serves as the magnetic resistance portion of this disclosure.

Figure 12:
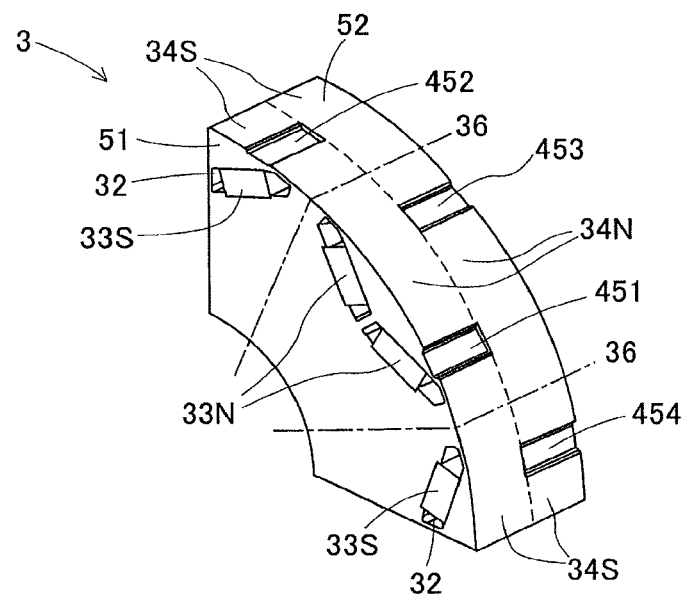
FIG. 12 is a diagram explaining a three-phase rotating electrical machine of a fifth embodiment disclosed here, which is a perspective view illustrating a range of a central angle of 90 degrees of the rotor.

In the fifth embodiment illustrated in FIG. 12, the first magnetic resistance portion 451 is arranged at the position adjacent to the circumferential end portion of each of the north magnetic pole acting portions 34N of the first iron core unit 51, the position adjacent to the circumferential end portion which is at a first side in the circumferential direction (a side moved in the clockwise direction in FIG. 12). The second magnetic resistance portion 452 is arranged at the position adjacent to the circumferential end portion of each of the south magnetic pole acting portions 34S of the first iron core unit 51, the position adjacent to the circumferential end portion which is at the first side in the circumferential direction. The third magnetic resistance portion 453 is arranged at the position adjacent to the circumferential end portion of each of the north magnetic pole acting portions 34N of the second iron core unit 52, the position adjacent to the circumferential end portion which is at a second side in the circumferential direction (a side moved in the counterclockwise direction in FIG. 12). The second side is different from the first side in the circumferential direction. The fourth magnetic resistance portion 454 is arranged at the position adjacent to the circumferential end portion of each of the south magnetic pole acting portions 34S of the second iron core unit 52, the position adjacent to the circumferential end portion which is at the second side in the circumferential direction. Each of the first to fourth magnetic resistance portions 451 to 454 serves as the magnetic resistance portion of this disclosure.

Figure 13:
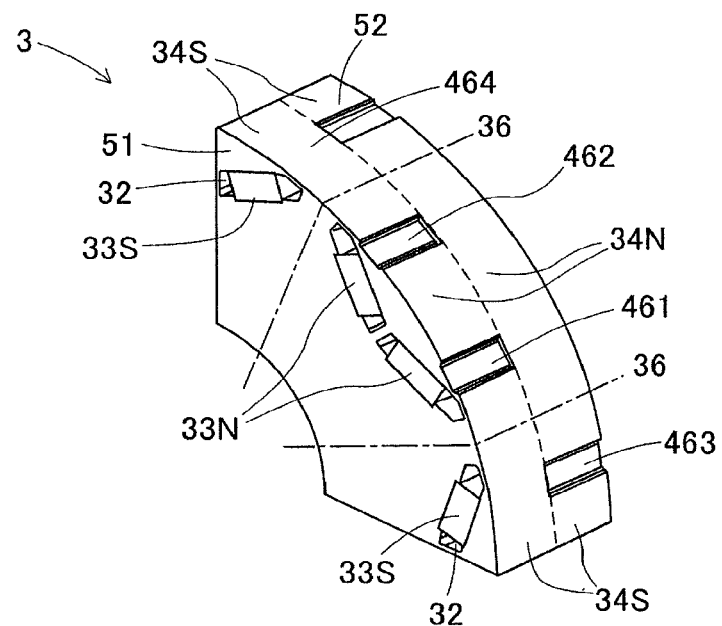
FIG. 13 is a diagram explaining a three-phase rotating electrical machine of a sixth embodiment disclosed here, which is a perspective view illustrating a range of a central angle of 90 degrees of the rotor.

In the sixth embodiment illustrated in FIG. 13, the first magnetic resistance portion 461 and the second magnetic resistance portion 462 are provided at the respective positions adjacent to the circumferential end portions of each of the north magnetic pole acting portions 34N of the first iron core unit 51, the positions adjacent to the circumferential end portions which are at both sides in the circumferential direction. The third magnetic resistance portion 463 and the fourth magnetic resistance portion 464 are provided at the respective positions adjacent to the circumferential end portions of each of the south magnetic pole acting portions 34S of the second iron core unit 52, the positions adjacent to the circumferential end portions which are at both sides in the circumferential direction. Each of the first to fourth magnetic resistance portions 461 to 464 serves as the magnetic resistance portion of this disclosure.

Figure 14:
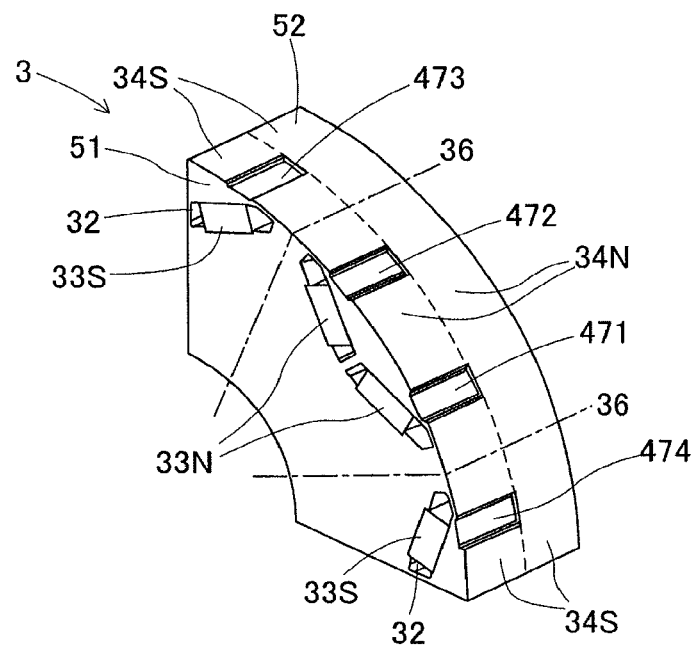
FIG. 14 is a diagram explaining a three-phase rotating electrical machine of a seventh embodiment disclosed here, which is a perspective view illustrating a range of a central angle of 90 degrees of the rotor.

In the seventh embodiment illustrated in FIG. 14, the first to fourth magnetic resistance portions 471 to 474 are provided at the positions adjacent to the circumferential end portions at both sides in the circumferential direction of each of the north magnetic pole acting portions 34N of the first iron core unit 51, and at the positions adjacent to the circumferential end portions at both sides in the circumferential direction of each of the south magnetic pole acting portions 34S of the first iron core unit 51. The magnetic resistance portions are not provided at the second iron core unit 52. Each of the first to fourth magnetic resistance portions 471 to 474 serves as the magnetic resistance portion of this disclosure.

In each of the fourth to sixth embodiments, to form the rotor core, only one shape of the iron core material formed in the thin plate shape may be used. Specifically, in each of the fourth and sixth embodiments, for the first and second iron core units 51 and 52, the iron core materials may be displaced in the circumferential direction relative to each other by an angle corresponding to one magnetic pole (that is, 45 degrees), and may be rotationally laminated onto each other. In the fifth embodiment, between the first and second iron core units 51 and 52, the iron core material may be inverted or turned over so that a front side and a back side are switched, and the iron core materials may be rotationally laminated onto each other.

On the other hand, in the seventh embodiment, the thin-plate-shaped iron core materials of two different shapes are needed depending on with or without the magnetic resistance portions 471 to 474. That is, to manufacture the rotor core of the seventh embodiment, two types of punch dies are needed.

The simulation is performed for the three-phase rotating electrical machine 1 of the second to seventh embodiments in a similar manner to the first embodiment, and the effect of reduction in the noises and vibrations, the loss of torque, and increase or decrease of the torque ripple and cogging torque are calculated or estimated. With regard to the effect of reduction in the noises and vibrations, a sound pressure level of the noises and vibrations corresponding to the spatial oscillation mode of the fourth order is calculated. With regard to the torque ripple and cogging torque, a range of fluctuation (a peak-to-peak value) is calculated.

Figure 15:
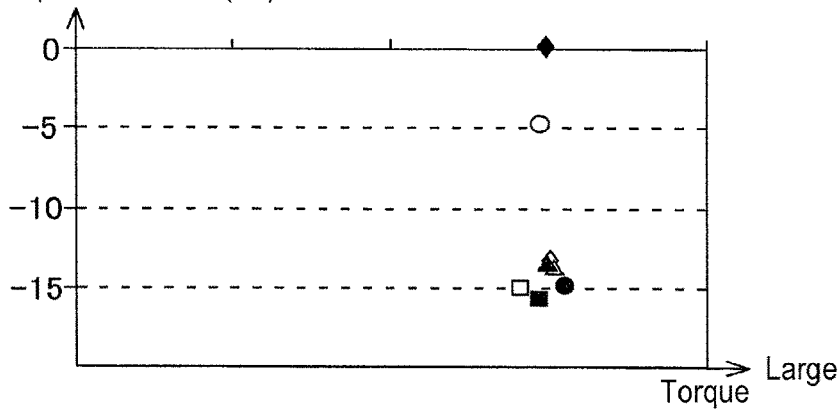
FIG. 15 is a diagram showing calculation results of effect of reduction in noises and vibrations and loss of torque, in the first to seventh embodiments.
Figure 16:
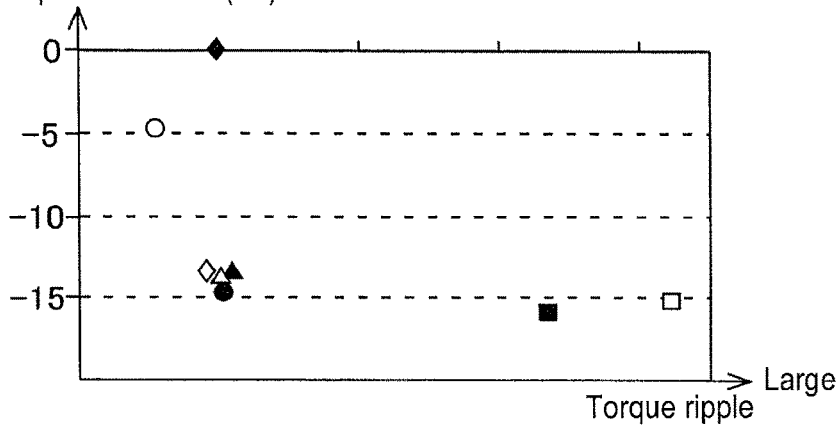
FIG. 16 is a diagram showing calculation results of the effect of reduction in the noises and vibrations and increase or decrease of torque ripple, in the first to seventh embodiments.
Figure 17:
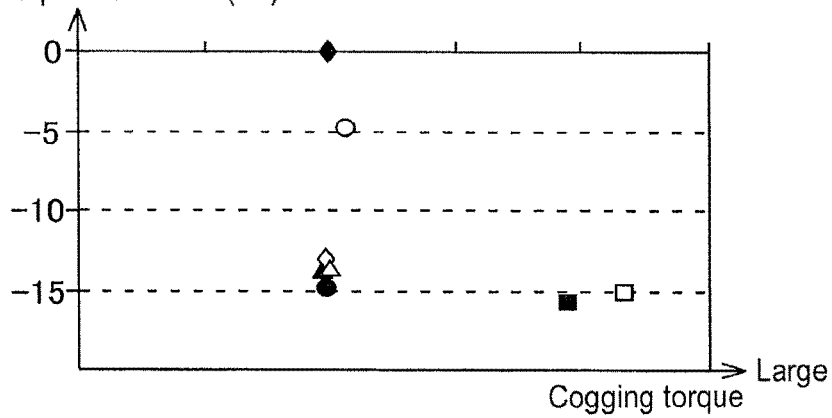
FIG. 17 is a diagram showing calculation results of the effect of reduction in the noises and vibrations, and increase or decrease of cogging torque, in the first to seventh embodiments.

FIG. 15 is a diagram showing calculation results of the effect of reduction in the noises and vibrations, and the loss of torque in the first to seventh embodiments. FIG. 16 is a diagram showing calculation results of the effect of reduction in the noises and vibrations, and the increase or decrease of the torque ripple in the first to seventh embodiments. FIG. 17 is a diagram showing calculation results of the effect of reduction in the noises and vibrations, and the increase or decrease of the cogging torque in the first to seventh embodiments.

In each of FIGS. 15 to 17, a calculation result obtained with a known or conventional configuration is used as a standard, which is indicated by the black vertically elongated diamond shape. The calculation result of the first embodiment is indicated by the black square shape. Similarly, the calculation result of the second embodiment is indicated by the white circular shape, the calculation result of the third embodiment is indicated by the white square shape, the calculation result of the fourth embodiment is indicated by the white vertically elongated diamond shape, the calculation result of the fifth embodiment is indicated by the black circular shape, the calculation result of the sixth embodiment is indicated by the black triangular shape, and the calculation result of the seventh embodiment is indicated by the white triangular shape.

As described above, in the first embodiment, the sound pressure level of the noises and vibrations is reduced by 16 dB compared to the known configuration, and the loss of torque is only slight. However, the torque ripple and cogging torque increase considerably. In the second embodiment, the effect of reducing the sound pressure level is approximately 5 dB, which is small. In addition, the torque ripple is reduced considerably and the cogging torque is almost unchanged. In the third embodiment, the effect of reducing the sound pressure level is 15 dB, which is approximately similar extent to the effect of reducing the sound pressure level in the first embodiment, however, the torque ripple and cogging torque increase considerably.

The calculation results of the fourth to seventh embodiments are similar to one another, and the effect of reducing the sound pressure level is approximately 13 dB to 15 dB, which is large, and the torque does not almost decrease. In addition, in the fourth to seventh embodiments, a negative effect of the increase in the torque ripple and cogging torque does not occur.

At the three-phase rotating electrical machine 1 of the second embodiment, the magnetic resistance portion 42 corresponds to the hole provided at the inner portion of the north magnetic pole acting portions 34N and the south magnetic pole acting portions 34S. According to the above-described configuration, in a case where the magnetic resistance portion 42 including the configuration of the hole is provided instead of the magnetic resistance portion 41 including the configuration of the recessed portion according to the first embodiment, the noises and vibrations during the operation are reduced compared to the known case.

At the three-phase rotating electrical machine 1 of the third embodiment, the magnetic resistance portion 43 is provided at each of the north magnetic pole acting portions 34N, at the position adjacent to the circumferential end portion at each side in the circumferential direction, or the magnetic resistance portion 43 is provided at each of the south magnetic pole acting portions 34S, at the position adjacent to the circumferential end portion at each side in the circumferential direction. According to the above-described configuration, the noises and vibrations during the operation are reduced to an extent similar to the first embodiment.

At the three-phase rotating electrical machine 1 of the fourth to seventh embodiments, the rotor core includes the plural iron core units 51, 52 laminated on each other to be arranged in the direction of an axial line AX, and the plural iron core units 51, 52 include the north magnetic poles 33N and the south magnetic poles 33S which are embedded in the iron core units 51, 52, and each of the north magnetic poles 33N and the south magnetic pole 33S is in common between the plural iron core units 51, 52. The rotor core includes the north magnetic pole acting portions 34N magnetized by the common north magnetic poles 33N and formed at each of the iron core units 51, 52, and the south magnetic pole acting portions 34S magnetized by the common south magnetic poles 33S and formed at each of the iron core units 51, 52. The rotor core includes the magnetic pole boundaries 36, 361, 362 each dividing the north magnetic pole acting portion 34N and the south magnetic pole acting portion 34S from each other in the circumferential direction, and each magnetic pole boundary 36, 361, 362 is in common between the plural iron core units 51, 52. The rotor core includes the magnetic resistance portions 441 to 444, 451 to 454, 461 to 464, 471 to 474 of which the arrangement positions in the circumferential direction differ from each other between the iron core units 51, 52.

According to the above-described configuration, the positions at which the permeance is changed are dispersed in the circumferential direction, and the circumferential imbalance in the mass of the rotor 3 is reduced. Accordingly, the negative effect can be restricted, that is, the torque ripple and cogging torque can be restricted from increasing.

Further, at the three-phase rotating electrical machine 1 of the fourth to seventh embodiments, the rotor core includes the first iron core unit 51 and the second iron core unit 52, the magnetic resistance portions 441 to 444, 451 to 454, 461 to 464, 471 to 474 are provided at a half of a total number of the positions adjacent to the circumferential end portions at both sides of each of the north magnetic pole acting portions 34N and each of the south magnetic pole acting portions 34S of the first and second iron core units 51, 52, and the magnetic resistance portions 441 to 444, 451 to 454, 461 to 464, 471 to 474 are arranged not to be side by side with each other in the direction of the axial line AX. According to the above-described configuration, two of the magnetic resistance portions 441 to 444, 451 to 454, 461 to 464, and 471 to 474 are positioned not to be arranged side by side each other in the direction of the axial line AX. Consequently, the effect of the dispersion of the permeance and the effect of correcting the imbalance in the mass are reliable and prominent At the three-phase rotating electrical machine 1 of the fourth embodiment, the magnetic resistance portion 441 is provided at each of the north magnetic pole acting portions 34N of the first iron core unit 51, at the position adjacent to the circumferential end portion at the portion (that is, the side) in the vicinity of the magnetic pole boundary 361 corresponding to the odd-numbered magnetic pole boundary 361 when counted in the circumferential direction, the magnetic resistance portion 442 is provided at each of the south magnetic pole acting portions 34S of the first iron core unit 51, at the position adjacent to the circumferential end portion at the portion (that is, the side) in the vicinity of the magnetic pole boundary 361 corresponding to the odd-numbered magnetic pole boundary 361 when counted in the circumferential direction, the magnetic resistance portion 443 is provided at each of the north magnetic pole acting portions 34N of the second iron core unit 52, at the position adjacent to the circumferential end portion at the portion (that is, the side) in the vicinity of the magnetic pole boundary 362 corresponding to the even-numbered magnetic pole boundary 362 when counted in the circumferential direction, and the magnetic resistance portion 444 is provided at each of the south magnetic pole acting portions 34S of the second iron core unit 52, at the position adjacent to the circumferential end portion at the portion (that is, the side) in the vicinity of the magnetic pole boundary 362 corresponding to the even-numbered magnetic pole boundary 362 when counted in the circumferential direction. According to the above-described configuration, the noises and vibrations during the operation can be reduced significantly, and the negative effect of the increase in the torque ripple and cogging torque does not occur.

At the three-phase rotating electrical machine 1 of the fifth embodiment, the magnetic resistance portion 451 is provided at each of the north magnetic pole acting portions 34N of the first iron core unit 51, at the position adjacent to the circumferential end portion at the first side in the circumferential direction, the magnetic resistance portion 452 is provided at each of the south magnetic pole acting portions 34S of the first iron core unit 51, at the position adjacent to the circumferential end portion at the first side in the circumferential direction, the magnetic resistance portion 453 is provided at each of the north magnetic pole acting portions 34N of the second iron core unit 52, at the position adjacent to the circumferential end portion at the second side in the circumferential direction, and the magnetic resistance portion 454 is provided at each of the south magnetic pole acting portions 34S of the second iron core unit 52, at the position adjacent to the circumferential end portion at the second side in the circumferential direction. According to the above-described configuration, the noises and vibrations during the operation can be reduced significantly, and the negative effect of the increase in the torque ripple and cogging torque does not occur.

At the three-phase rotating electrical machine 1 of the sixth embodiment, the magnetic resistance portions 461 and 462 are provided at each of the north magnetic pole acting portions 34N of the first iron core unit 51, at the positions adjacent to the circumferential end portions at both sides in the circumferential direction, and the magnetic resistance portions 463 and 464 are provided at each of the south magnetic pole acting portions 34S of the second iron core unit 52, at the positions adjacent to the circumferential end portions at both sides in the circumferential direction. According to the above-described configuration, the noises and vibrations during the operation can be reduced significantly, and the negative effect of the increase in the torque ripple and cogging torque does not occur.

At the three-phase rotating electrical machine 1 of the seventh embodiment, the magnetic resistance portion 471, 472 is provided at each of the north magnetic pole acting portions 34N of the first iron core unit 51, at the position adjacent to the circumferential end portion at each side in the circumferential direction, the magnetic resistance portion 473, 474 is provided at each of the south magnetic pole acting portions 34S of the first iron core unit 51, at the position adjacent to the circumferential end portion at each side in the circumferential direction, and the magnetic resistance portion 471 to 474 is not provided at the second iron core unit 52. According to the above-described configuration, the noises and vibrations during the operation can be reduced significantly, and the negative effect of the increase in the torque ripple and cogging torque does not occur.

Further, in each of the fourth to sixth embodiments, the iron core material of the rotor core, which is formed in the thin plate shape, may include one shape or configuration. Accordingly, the rotor core can be manufactured easily. In addition, the number of components forming the rotor 3 does not increase, thereby restricting the costs from increasing.

Next, the eighth embodiment will be described. Simulation intended for the three-phase rotating electrical machine 1 according to the eighth embodiment will be described. As described above, the three-phase rotating electrical machine 1 of the eighth embodiment includes the configuration of the radial air gap type that is similar to the first embodiment, and is different from the three-phase rotating electrical machine 1 of the first embodiment in that the number ns of the slots 24 of the stator 2 is 36. In addition, the number P of the magnetic poles of the rotor 3 is eight in a similar manner to the first embodiment.

In the eighth embodiment, similarly to the first embodiment, each of the magnetic resistance portions includes the configuration of the recessed portion and the magnetic resistance portions are arranged at the eight positions, however, the optimal values of the separation angle θ1 and the range angle θ2 are different from the optimal values in the first embodiment. In the simulation, the magnetic flux density in the air gap AG is calculated or estimated in a similar manner to the first embodiment. In addition, similarly to the first embodiment, the lowest order of the spatial oscillation mode of the electromagnetic force is the fourth order. In consequence of the repeated simulation, the optimal value of the separation angle θ1 is 10 degrees (10°), which is equal to the slot pitch angle θS, and the optimal value of the range angle θ2 is 5 degrees (5°), which is a half of the slot pitch angle θS. The above-stated optimal values satisfy (Expression 1) and (Expression 2), which are generalized. The results of the simulation using the above-stated optimal values are shown in FIGS. 18 to 21 below.

Figure 18:
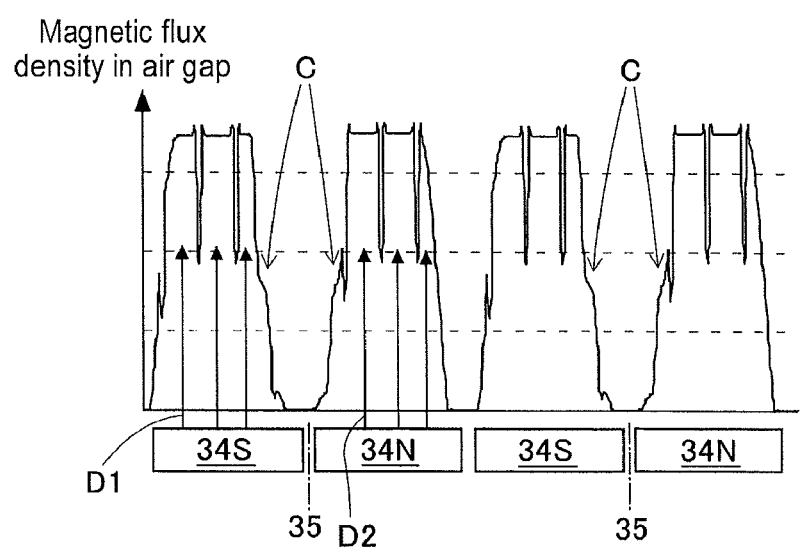
FIG. 18 is a diagram showing a calculation result of magnetic flux density in the air gap in a state where the circumferential center of the south magnetic pole acting portion directly faces the teeth according to the eighth embodiment.
Figure 19:
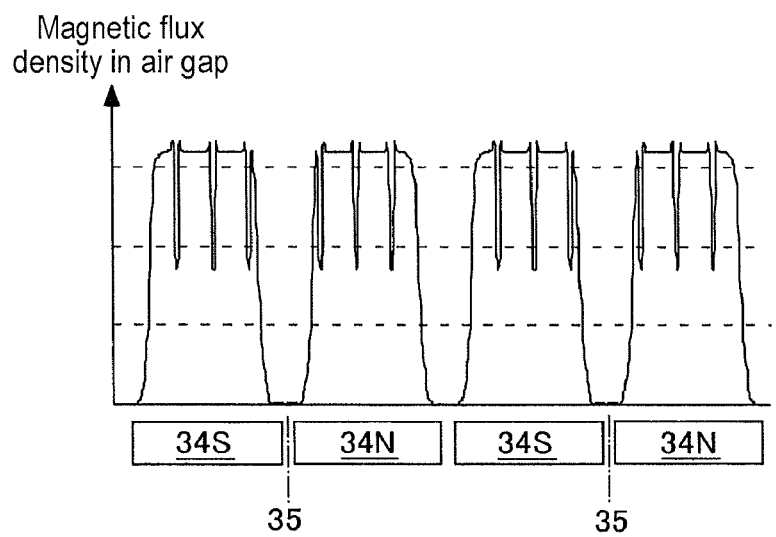
FIG. 19 is a diagram showing a calculation result of the magnetic flux density in the air gap in a state where the magnetic pole boundary directly faces the teeth according to the eighth embodiment.
Figure 20:
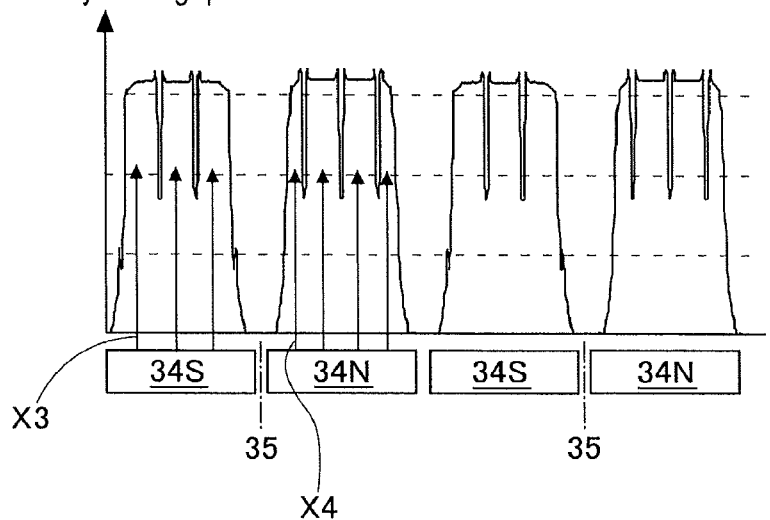
FIG. 20 is a diagram showing a calculation result in the same state as FIG. 18, according to the known configuration that does not include the magnetic resistance portion.
Figure 21:
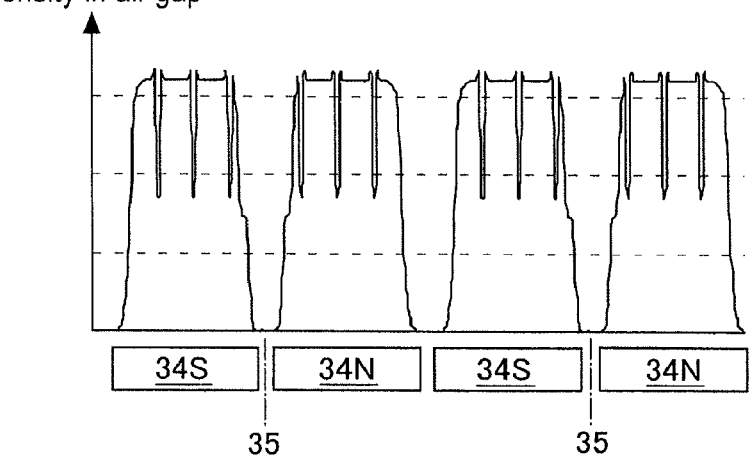
FIG. 21 is a diagram showing a calculation result in the same state as FIG. 19, according to the known configuration.

FIG. 18 is a diagram showing a calculation result of the magnetic flux density in the air gap AG in a state where the circumferential center of the south magnetic pole acting portion 34S directly faces the teeth 23 according to the eighth embodiment. FIG. 19 is a diagram showing a calculation result of the magnetic flux density in the air gap AG in a state where the magnetic pole boundary 35 directly faces the teeth 23 according to the eighth embodiment. On the other hand, FIG. 20 is a diagram, according to the known configuration that does not include the magnetic resistance portion, showing a calculation result in the same state as FIG. 18. FIG. 21 is a diagram, according to the known configuration, showing a calculation result in the same state as FIG. 19. In each of FIGS. 18 to 21, the horizontal axis represents a portion of the rotor 3 in a range of a central angle of 180 degrees, that is, the portion corresponding the south magnetic pole acting portions 34S and the north magnetic pole acting portions 34N that are equivalent to four magnetic poles. In each of FIGS. 18 to 21, the vertical axis represents the magnetic flux density in the air gap AG.

In the known configuration of FIG. 20, the electromagnetic force at the S pole side of the south magnetic pole acting portion 34S acts on the three teeth 23 as indicated by arrows X3. On the other hand, the electromagnetic force at the N pole side of the north magnetic pole acting portion 34N acts on the four teeth 23 as indicated by arrows X4. Due to the imbalance, in the known configuration, the stator 2 is deformed largely in the deformation mode of the fourth order, thereby increasing the noises and vibrations at the operation.

In contrast, in the eighth embodiment of FIG. 18, as indicated by arrows C, the magnetic flux density in the vicinity of the magnetic pole boundary 35 is reduced by the function of the magnetic resistance portion. Accordingly, as indicated by arrows D1, the electromagnetic force at the S pole side of the south magnetic pole acting portion 34S remains acting on the three teeth 23. On the other hand, as indicated by arrows D2, the electromagnetic force at the N pole side of the north magnetic pole acting portion 34N is reduced to act on the three teeth 23. That is, the distribution of the electromagnetic force at the N pole side of the north magnetic pole acting portion 34N approximates the distribution of the electromagnetic force at the S pole side of the south magnetic pole acting portion 34S. Consequently, the imbalance between the electromagnetic force at the N pole side and the electromagnetic force at the S pole side is alleviated or reduced, and the deformation of the stator 2 is reduced, and thus the noises and vibrations during the operation become lower than the known configuration.

In the known configuration of FIG. 21, the electromagnetic force of the north magnetic pole acting portion 34N and the electromagnetic force of the south magnetic pole acting portion 34S form a substantially left-right mirror symmetry shape relative to the magnetic pole boundary 35, and are originally balanced. In the eighth embodiment of FIG. 19, the balance is maintained. That is, the magnetic resistance portion includes the function of alleviating the unbalanced state in a case where the electromagnetic forces at the N pole side and the S pole side are unbalanced largely. In a case where the electromagnetic forces at the N pole side and the S pole side are originally balanced, the magnetic resistance portion maintains the balanced state.

As a result of the simulation, at the three-phase rotating electrical machine 1 of the eighth embodiment, the sound pressure level of the noises and vibrations corresponding to the spatial oscillation mode of the fourth order is reduced by 8 dB compared to the known configuration. In FIG. 18, the magnetic flux density in the vicinity of the magnetic pole boundary 35 is reduced, and accordingly the magnetic flux density at other positions is increased compared to the known configuration (refer to FIG. 20). Thus, the entire magnetic flux reciprocating or travelling back and forth between the stator 2 and the rotor 3 remains unchanged. Consequently, also in the eighth embodiment, the torque outputted when the three-phase rotating electrical machine 1 operates as the electric motor is not lost or decreased and the electric power outputted when the three-phase rotating electrical machine 1 operates as the electric generator is not lost or decreased.

Further, as a result of the simulation performed with the configuration of eighth embodiment with the separation angle θ1 and the range angle θ2 which are changed, the sound pressure level is reduced in an angle range of (Expression 5) and (Expression 6), which are the generalized expressions, thereby showing the effectiveness. In addition, validity of (Expression 1), (Expression 2), (Expression 5) and (Expression 6) has been confirmed in other configuration than the configurations of the first and eighth embodiments.

At the three-phase rotating electrical machine 1 of the first, third to eighth embodiments, in a case where the number of the slots 24 is ns and the number P of the north magnetic poles 33N and the south magnetic poles 33S is eight, the separation angle θ1 (degree) representing the angle by which the circumferential central position of the magnetic resistance portion 41 is separated or away from the magnetic pole boundary 35 satisfies the (Expression 5), and the range angle θ2 (degree) representing the range in which the magnetic resistance portion 41 exists in the circumferential direction satisfies the (Expression 6). According to the above-described configuration, the sound pressure level of the noises and vibrations can be reduced by a predetermined amount or greater than the predetermined amount (by 5 dB or greater than 5 dB in the example of the first embodiment).

Further, at the three-phase rotating electrical machine 1 of the first, third to eighth embodiments, the separation angle θ1 (degree)=360/ns, and the range angle θ2 (degree)=180/ns (degree). According to the above-described configuration, the sound pressure level of the noises and vibrations can be reduced significantly (by 13 dB to 16 dB in the examples of the first and third to seventh embodiments).

Application and variation of each of the embodiments will be described. In each of the aforementioned embodiments, the configuration, the size and the arrangement positions of the magnetic resistance portions 41 to 43, 441 to 444, 451 to 454, 461 to 464 and 471 to 474 can be changed or modified appropriately in response to the configuration, the size and the arrangement positions of the embedding hole 32, and/or the north magnetic pole 33N and the south magnetic pole 33S. In addition, the fourth to seventh embodiments can be expanded and modified in such a manner that the rotor core is divided into three or more iron core units and the iron core units are rotationally laminated onto each other, in the direction of the axial line AX. Then, the arrangement positions of the magnetic resistance portions in the circumferential direction are offset relative to one another among the iron core units.

Further, this disclosure can be implemented in a three-phase rotating electrical machine including other numbers of slots and the magnetic poles than the numbers described in the aforementioned embodiments. In addition, this disclosure is applicable to a configuration of an outer rotor type in which a stator is arranged at an inner circumferential side and a rotor is arranged at an outer circumferential side. In addition, this disclosure is applicable to a configuration of an axial air gap type in which a stator and a rotor are arranged side by side in an axis line direction with an air gap which is orthogonal to the axis line is disposed between the stator and the rotor. Other various applications and/or changes can be made to this disclosure.

The three-phase rotating electrical machine disclosed here can not only be mounted on the hybrid vehicle as described in the embodiments but also be extensively applicable as a drive source of various types of machine tools, working apparatuses, transportation machinery and/or pumps which are for industrial use, for example.

Generally, at an iron core in which a north magnetic pole and a south magnetic pole are embedded or buried, the vicinity of a surface of the iron core is magnetized by the north magnetic pole and the south magnetic pole, and accordingly a north magnetic pole acting portion and a south magnetic pole acting portion are formed. At the three-phase rotating electrical machine of the aforementioned embodiments, the number of the teeth of the stator core, the teeth which the north magnetic pole acting portion and the south magnetic pole acting portion face, changes depending on a rotational phase of the rotor. Accordingly, the difference arises between the distribution of the electromagnetic force at the N pole side, which acts from the north magnetic pole acting portion to the teeth, and the distribution of the electromagnetic force at the S pole side, which acts from the south magnetic pole acting portion to the teeth, thereby causing the noises and vibrations during the operation. By forming the magnetic resistance portion in the vicinity of, or near, the magnetic pole boundary of the rotor core, the imbalance is intentionally given to the circumferential distribution of the permeance (the reciprocal of magnetic resistance) in order to change the distribution of the magnetic flux. Accordingly, the distribution of the electromagnetic force at the N pole side and the distribution of the electromagnetic force at the S pole side are changed to reduce the difference therebetween, thereby lowering the noises and vibrations at a time of the operation than the conventional case. According to the above-described configuration, noises and vibrations during operation is reduced.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A three-phase rotating electrical machine, comprising:
a stator including:
a stator core provided with a plurality of teeth arranged in a circumferential direction and a plurality of slots arranged in the circumferential direction; and
winding wound at the plurality of slots;
a rotor rotatably supported to face the stator and to be coaxial with the stator, the rotor including:
a rotor core provided with a plurality of embedding holes arranged in the circumferential direction; and
a north magnetic pole and a south magnetic pole which are embedded in the plurality of embedding holes, respectively, to be arranged alternately with each other in the circumferential direction;
the three-phase rotating electrical machine including a fractional slot configuration in which a number of the slots per pole per phase is not an integer number, the number of the slots per pole per phase being obtained by dividing a number of the slots by a number of the north magnetic pole and the south magnetic pole, and by three; and
the rotor core including:
a north magnetic pole acting portion which corresponds to a portion facing the stator and at which magnetic flux of the north magnetic pole acts;
a south magnetic pole acting portion which corresponds to a portion facing the stator and at which magnetic flux of the south magnetic pole acts;
a magnetic pole boundary dividing the north magnetic pole acting portion and the south magnetic pole acting portion from each other in the circumferential direction;
a magnetic resistance portion provided at a position adjacent to a circumferential end portion of at least one of the north magnetic pole acting portion and the south magnetic pole acting portion, the position adjacent to the circumferential end portion being in a vicinity of the magnetic pole boundary; and
the magnetic resistance portion restricting the magnetic flux from passing through between the at least one of the north magnetic pole and the south magnetic pole, and the teeth, wherein
the magnetic pole boundary is provided at a plurality of positions,
the magnetic resistance portion is provided at the north magnetic pole acting portion, at the position adjacent to the circumferential end portion only at a portion in the vicinity of each alternate magnetic pole boundary out of the plurality of the magnetic pole boundaries, and
the magnetic resistance portion is provided at the south magnetic pole acting portion, at the position adjacent to the circumferential end portion only at a portion in the vicinity of the each alternate magnetic pole boundary out of the plurality of the magnetic pole boundaries.

2. The three-phase rotating electrical machine according to claim 1, wherein
the magnetic resistance portion is provided at the north magnetic pole acting portion, at the position adjacent to the circumferential end portion at each side in the circumferential direction, or
the magnetic resistance portion is provided at the south magnetic pole acting portion, at the position adjacent to the circumferential end portion at each side in the circumferential direction.

3. The three-phase rotating electrical machine according to claim 1, wherein the rotor core includes:
a plurality of iron core units laminated on each other to be arranged in a direction of an axial line, the plurality of iron core units including the north magnetic pole and the south magnetic pole which are embedded in the iron core units, each of the north magnetic pole and the south magnetic pole being in common between the plurality of iron core units;
the north magnetic pole acting portion magnetized by the common north magnetic pole and formed at each of the iron core units;
the south magnetic pole acting portion magnetized by the common south magnetic pole and formed at each of the iron core units;
the magnetic pole boundary dividing the north magnetic pole acting portion and the south magnetic pole acting portion from each other in the circumferential direction, the magnetic pole boundary being in common between the plurality of iron core units; and
the magnetic resistance portions of which circumferential positions differ from each other between the plurality of iron core units.

4. The three-phase rotating electrical machine according to claim 3, wherein
the rotor core includes a first iron core unit and a second iron core unit,
the magnetic resistance portions are provided at a half of a total number of the positions adjacent to the circumferential end portions at both sides of each of the north magnetic pole acting portions and each of the south magnetic pole acting portions of the first and second iron core units, and
the magnetic resistance portions are arranged not to be side by side with each other in the direction of the axial line.

5. The three-phase rotating electrical machine according to claim 4, wherein
the magnetic resistance portion is provided at each of the north magnetic pole acting portions of the first iron core unit, at the position adjacent to the circumferential end portion at a portion in the vicinity of the magnetic pole boundary corresponding to an odd-numbered magnetic pole boundary when counted in the circumferential direction,
the magnetic resistance portion is provided at each of the south magnetic pole acting portions of the first iron core unit, at the position adjacent to the circumferential end portion at a portion in the vicinity of the magnetic pole boundary corresponding to the odd-numbered magnetic pole boundary when counted in the circumferential direction,
the magnetic resistance portion is provided at each of the north magnetic pole acting portions of the second iron core unit, at the position adjacent to the circumferential end portion at a portion in the vicinity of the magnetic pole boundary corresponding to an even-numbered magnetic pole boundary when counted in the circumferential direction, and the magnetic resistance portion is provided at each of the south magnetic pole acting portions of the second iron core unit, at the position adjacent to the circumferential end portion at a portion in the vicinity of the magnetic pole boundary corresponding to the even-numbered magnetic pole boundary when counted in the circumferential direction.

6. The three-phase rotating electrical machine according to claim 4, wherein
the magnetic resistance portion is provided at each of the north magnetic pole acting portions of the first iron core unit, at the position adjacent to the circumferential end portion at a first side in the circumferential direction,
the magnetic resistance portion is provided at each of the south magnetic pole acting portions of the first iron core unit, at the position adjacent to the circumferential end portion at the first side in the circumferential direction,
the magnetic resistance portion is provided at each of the north magnetic pole acting portions of the second iron core unit, at the position adjacent to the circumferential end portion at a second side in the circumferential direction, and
the magnetic resistance portion is provided at each of the south magnetic pole acting portions of the second iron core unit, at the position adjacent to the circumferential end portion at the second side in the circumferential direction.

7. The three-phase rotating electrical machine according to claim 4, wherein
the magnetic resistance portion is provided at each of the north magnetic pole acting portions of the first iron core unit, at the position adjacent to the circumferential end portion at each side in the circumferential direction, and
the magnetic resistance portion is provided at each of the south magnetic pole acting portions of the second iron core unit, at the position adjacent to the circumferential end portion at each side in the circumferential direction.

8. The three-phase rotating electrical machine according to claim 1, wherein the magnetic resistance portion corresponds to a recessed portion provided at a surface of the at least one of the north magnetic pole acting portion and the south magnetic pole acting portion, the surface faces the stator.

9. The three-phase rotating electrical machine according to claim 8, wherein in a case where a number of the slots is ns, and the number of the north magnetic pole and the south magnetic pole is eight,
a separation angle representing an angle by which a circumferential central position of the magnetic resistance portion is separated from the magnetic pole boundary satisfies the following expression:

$$270/ns \leq \text{the separation angle (degree)} \leq 450/ns, \text{ and}$$

a range angle representing a range in which the magnetic resistance portion exists in the circumferential direction satisfies the following expression:

$$90/ns \leq \text{the range angle (degree)} \leq 270/ns.$$

10. The three-phase rotating electrical machine according to claim 9, wherein the separation angle (degree)=360/ns, and the range angle (degree)=180/ns.

11. The three-phase rotating electrical machine according to claim 1, wherein the magnetic resistance portion corresponds to a hole provided at an inner portion of the at least one of the north magnetic pole acting portion and the south magnetic pole acting portion.

* * * * *